US012811452B2

(12) United States Patent
Itasaka

(10) Patent No.: US 12,811,452 B2
(45) Date of Patent: Nov. 24, 2026

(54) ROTOR STRUCTURE HAVING STRUCTURE FOR INCREASED EFFICIENCY OF A MOTOR

(71) Applicant: MCF Electric Drive Corporation, Hiroshima City (JP)

(72) Inventor: Naoki Itasaka, Hiroshima City (JP)

(73) Assignee: MCF Electric Drive Corporation, Hiroshima City (JP)

(*) Notice: Subject to any disclaimer, the term of this patent is extended or adjusted under 35 U.S.C. 154(b) by 132 days.

(21) Appl. No.: 18/967,055

(22) Filed: Dec. 3, 2024

(65) Prior Publication Data

US 2025/0286420 A1 Sep. 11, 2025

(30) Foreign Application Priority Data

Mar. 5, 2024 (JP) ................................ 2024-033422

(51) Int. Cl.
*H02K 1/32* (2006.01)
*H02K 1/276* (2022.01)

(52) U.S. Cl.
CPC ............... *H02K 1/32* (2013.01); *H02K 1/276* (2013.01)

(58) Field of Classification Search
CPC ............. H02K 1/27; H02K 1/276; H02K 1/32
USPC ..................................................... 310/156.08
See application file for complete search history.

(56) References Cited

U.S. PATENT DOCUMENTS 6,597,079 B2 * 7/2003 Miyashita .............. H02K 1/276 310/156.48
8,212,447 B2 * 7/2012 Fukuda ................ H02K 1/2766 310/156.53
8,766,468 B1 * 7/2014 Rilla ....................... B60L 15/20 310/156.53
10,361,599 B2 * 7/2019 Tsuda ..................... H02K 21/14
10,594,177 B2 * 3/2020 Nakagawa ............. H02K 15/03
10,790,713 B2 * 9/2020 Mochida ................ H02K 19/10
(Continued)

FOREIGN PATENT DOCUMENTS

CN 112688522 A 4/2021
JP 2001-025183 A 1/2001
(Continued)

OTHER PUBLICATIONS

Office Action dated Oct. 28, 2015, issued for corresponding Taiwan Application No. 114107995.

*Primary Examiner* — Rashad H Johnson
(74) *Attorney, Agent, or Firm* — Edell, Shapiro & Finnan, LLC

(57) ABSTRACT

A rotor structure of a synchronous motor in which a rotor rotates in synchronization with the rotating magnetic field generated by a stator, wherein the rotor comprises a cylindrical rotor core and a plurality of permanent magnets embedded in the rotor core that form a plurality of magnetic poles arranged in the circumferential direction of the rotor, a first protrusion portion extending in the circumferential direction so as to straddle the adjacent magnetic poles when viewed in the axial direction and protruding radially outward is formed on an outer circumferential surface of the rotor core; and inside the first protrusion portion, a first gap extending circumferentially when viewed in the axial direction is formed and a second protrusion portion protruding radially outward from a portion that defines the radially inner side of the first gap is formed.

14 Claims, 30 Drawing Sheets

(56) References Cited

U.S. PATENT DOCUMENTS

| | | | | |
|---|---|---|---|---|
| 2007/0126305 | A1* | 6/2007 | Okuma | H02K 1/2766 310/156.53 |
| 2010/0194228 | A1* | 8/2010 | Lee | H02K 29/03 310/156.53 |
| 2020/0266677 | A1* | 8/2020 | Tago | H02K 1/165 |
| 2021/0111602 | A1 | 4/2021 | Yang et al. | |
| 2022/0077735 | A1* | 3/2022 | Xu | H02K 1/2766 |
| 2023/0091530 | A1* | 3/2023 | Nigo | H02K 1/2773 310/156.56 |
| 2023/0243360 | A1* | 8/2023 | Shimokawa | F04D 19/002 417/354 |
| 2025/0343454 | A1* | 11/2025 | Nishimura | H02K 1/2781 |

FOREIGN PATENT DOCUMENTS

| | | | |
|---|---|---|---|
| JP | 2018011450 | A | 1/2018 |
| JP | 2022080421 | A | 5/2022 |
| TW | I808910 | B | 7/2023 |

* cited by examiner

ROTOR STRUCTURE HAVING STRUCTURE FOR INCREASED EFFICIENCY OF A MOTOR

CROSS-REFERENCE TO RELATED APPLICATIONS

This application is based on Japanese Application No. 2024-33422, filed on Mar. 5, 2024, the contents of which are incorporated herein by reference.

BACKGROUND OF THE INVENTION

Field of the Invention

The present invention relates to a rotor structure, and more particularly to a rotor structure of a synchronous motor in which a rotor rotates in synchronization with the rotating magnetic field generated by a stator.

Background of the Disclosure

As electric vehicles become more widespread, there is a demand for improved mountability and productivity of the motors that drive them, easier deployment across a range of vehicle models, and lower costs, and to achieve these goals, however, there is a demand for motors that are smaller while maintaining the same output level (torque).

In this regard, synchronous motors have the characteristic of combining magnetic torque produced by the attraction and repulsion of magnets with reluctance torque that utilizes the magnetic saliency of the rotor core, to be able to achieve high output, thus it can be said that synchronous motors are suitable for miniaturization of motors while maintaining the same output level.

Regarding miniaturization of such synchronous motors, for example, JP-A No. 2001-25183 discloses an electric motor stator in which an annular auxiliary core made of a magnetic material is provided at the axial end of an annular back yoke portion that is positioned outside the teeth portion around which the stator coil is wound.

According to JP-A No. 2001-25183, the cross-sectional area of the back yoke portion required to pass magnetic flux to obtain the desired torque can be supplemented by an auxiliary core, making it possible to reduce the radial thickness of the back yoke portion and reduce the outer diameter of the stator core, thereby making it possible to reduce the outer diameter of the motor.

However, merely reducing the radial thickness of the back yoke portion is not enough to significantly reduce the size of the motor, and in the case of JP-A No. 2001-25183, an auxiliary core must be provided separately, which goes against the need for reduced costs.

By the way, making a motor smaller means that the temperature rises more even if the motor loss remains the same. In a synchronous motor, if the temperature inside the motor rises significantly, the permanent magnet embedded in the rotor core, for example, becomes hot, which may result in demagnetization of the permanent magnet and ultimately a decrease in torque. For this reason, in order to make a synchronous motor smaller, it is necessary to increase the efficiency of the motor in order to reduce the amount of heat generated inside the motor and to reduce losses.

Furthermore, to miniaturize a motor while maintaining the same output level, it is essential to increase the current density and magnetic flux density, however, increasing the current density and magnetic flux density increases vibration (torque ripple) and the associated noise, therefore, to achieve a miniaturized motor, not only high efficiency, but also low vibration and noise are required.

The present invention has been made in consideration of these points, and its object is to provide a rotor structure that can achieve high efficiency and low vibration and noise even when a synchronous motor is miniaturized.

SUMMARY

In order to achieve the above object, the rotor structure according to the present invention is designed to suppress the generation of harmonic components of magnetic flux that hinder high efficiency and low vibration and noise of a motor.

Specifically, the present invention is directed to a rotor structure of a synchronous motor in which a rotor rotates in synchronization with a rotating magnetic field generated by a stator.

This rotor structure is characterized in that: the rotor comprises a cylindrical rotor core and a plurality of permanent magnets embedded in the rotor core that form a plurality of magnetic poles arranged in a circumferential direction of the rotor, a first protrusion portion extending in the circumferential direction so as to straddle adjacent magnetic poles when viewed in an axial direction and protruding radially outward is formed on an outer circumferential surface of the rotor core; and inside the first protrusion portion, a first gap extending circumferentially when viewed in the axial direction is formed and a second protrusion portion protruding radially outward from a portion that defines a radially inner side of the first gap is formed.

As described above, the present invention aims to increase the efficiency and reduce vibration and noise even when the synchronous motor is miniaturized, and since the "efficiency" of a motor is "output/(output+loss)", in order to increase the efficiency of a motor, it is necessary to increase the output while suppressing losses (requirement 1).

Here, the "output" of a motor is "torque×rotation speed", so in order to increase the output, it is necessary to increase the torque that can be generated by the same magnitude of stator coil current (requirement 2) and rotate the rotor smoothly without waste. In order to increase the torque that can be generated, it is effective to increase the proportion of magnetic flux (fundamental wave component) that contributes to the generation of torque. In addition, in order to rotate the rotor smoothly without waste, it is considered ideal to change (distribute) the magnetic flux density in a space (air gap) between the stator and rotor in a sinusoidal shape at each magnetic pole of the rotor (requirement 3). If the magnetic flux density changes in a sinusoidal shape in an air gap between the stator and rotor in this way, torque ripple (vibration) is also suppressed, so it is possible to achieve high efficiency and simultaneously low vibration and noise.

However, it is known that in a synchronous motor, the magnetic flux contains harmonic components that not only do not contribute to torque generation, but are superimposed on the fundamental wave components and distort the waveform of the magnetic flux density in an air gap between the stator and rotor. Furthermore, the "loss" in a rotor made mainly of a magnetic material is iron loss, and iron loss depends on the fluctuating frequency of the magnetic flux, however, harmonic components have high frequency components, so they increase iron loss, which also hinders the high efficiency of a motor.

It is known that such harmonic components tend to appear in an air gap where magnetic exchange takes place between the rotor and stator, and between magnetic poles where magnetic flux short circuits are likely to occur, in other words, in the vicinity of the spaces between the magnetic poles on the outer periphery of the rotor core.

In this respect, according to the present invention, since a first gap extending in the circumferential direction is formed inside a first protrusion portion extending in the circumferential direction so as to straddle adjacent magnetic poles on the outer peripheral surface of the rotor core, the magnetic flux is blocked by such first gap, and short circuits of the magnetic flux between the magnetic poles are suppressed, therefore, the generation of harmonic components can be suppressed. In this way, the generation of harmonic components having high frequency components is suppressed, so that the fluctuation frequency of the magnetic flux can be lowered, and thus the increase in iron loss that depends on the fluctuation frequency of the magnetic flux can be suppressed (satisfying requirement 1). Furthermore, by suppressing the increase in iron loss (loss), it is possible to reduce the amount of heat generated inside a motor even when the synchronous motor is made smaller.

Furthermore, by suppressing the generation of harmonic components, it is possible to make the magnetic flux density in an air gap between the stator and rotor closer to an ideal sinusoidal shape (satisfying requirement 3). This allows the rotor to rotate smoothly without waste, while reducing vibration (torque ripple).

In addition, the first gap suppresses the generation of harmonic components of the magnetic flux that do not contribute to the generation of torque, thereby increasing the proportion of the fundamental wave components of the magnetic flux that contributes to the generation of torque. However, simply forming the first gap may result in a decrease in torque, and in that case, it is expected that the effect of increasing the total torque will be small even if the proportion of the fundamental wave components of the magnetic flux is increased.

In this regard, in the present invention, a first protrusion portion that protrudes radially outward is formed on the outer circumferential surface of the rotor core, and a second protrusion portion that protrudes radially outward from a portion that defines the radially inner side of the first gap is formed inside such first protrusion portion, so that the reduction in torque can be compensated for by the reluctance torque generated by the attractive force between the poles and the salient poles (the first and second protrusion portions) due to the rotating magnetic field of the stator. In this way, the torque that can be generated by the same magnitude of stator coil current can be increased by combining the securing of reluctance torque due to magnetic saliency and the increase in the proportion of the fundamental wave components of the magnetic flux described above (satisfying requirement 2).

Moreover, since the first and second protrusion portions as double protrusion portions aligned in the radial direction are formed, when generating the same reluctance torque, for example, the radially outward protruding height of the first protrusion portion itself can be made lower than that of a rotor structure having only the first protrusion portion formed. In this way, since it becomes possible to make the outer circumferential surface of the cylindrical rotor core closer to a perfect circle by setting the radially outward protruding height of the first protrusion portion low, it is also possible to reduce the cogging torque. Therefore, the reduction in the cogging torque combined with the reduction in the torque ripple described above makes it possible to reliably suppress motor vibration and the associated noise, even when the current density and magnetic flux density are increased in miniaturizing the synchronous motor.

As described above, according to the present invention, it is possible to achieve high efficiency and low vibration and noise even when a synchronous motor is miniaturized, therefore, it becomes possible to realize miniaturizing a motor while maintaining the output level without demagnetization of permanent magnets caused by high temperatures or vibration and noise.

In addition, in the above rotor structure, the first protrusion portion may be formed so as to protrude relatively radially outward by recessing radially inward an outer peripheral surface of the rotor core corresponding to both circumferential ends of the first protrusion portion when viewed in the axial direction.

According to this configuration, the first protrusion portion is not absolutely protruded radially outward from the outer circumferential surface of the cylindrical rotor core, but is allowed to protrude relatively radially outward by recessing radially inward the outer peripheral surface of the rotor core corresponding to both circumferential ends of the first protrusion portion, therefore, the cogging torque can be further reduced. This makes it possible to further reduce vibration and noise even when the synchronous motor is made smaller.

Furthermore, in the above rotor structure, the second protrusion portion may protrude at an incline with respect to the radial direction so as to be inclined at a predetermined angle in the circumferential direction as the portion extends radially outward.

According to this configuration, the second protrusion portion which contributes to the magnetic saliency protrudes at an inclination with respect to the radial direction so that it is inclined at a predetermined angle in the circumferential direction as it goes radially outward, therefore, it becomes possible to finely control the ripple components (harmonic components) of the reluctance torque, by setting the predetermined angle.

In the above rotor structure, the second protrusion portion may extend to a portion that defines the radially outer side of the first gap so as to circumferentially divide the first gap.

According to this configuration, the protruding length of the second protrusion portion can be made longer than when the second protrusion portion is formed so as not to reach the portion that defines the radial outside of the first gap. This makes it possible to further ensure reluctance torque due to magnetic saliency.

By the way, since the presence of harmonic components in the magnetic flux in an air gap between the stator and rotor is a cause of torque ripple, and since this magnetic flux is a function of inductance and inductance is a function of magnetic resistance, hence, a change in magnetic resistance can be considered to amplify the harmonic components in the magnetic flux and worsen the torque ripple. Therefore, depending on the arrangement of permanent magnets and flux barriers at each magnetic pole, the positional relationship between the stator teeth and the permanent magnets, etc. may change as the rotor rotates, causing a large change in magnetic resistance, and in this case, the harmonic components in the magnetic flux may be amplified and the torque ripple may worsen.

Also, since the teeth are usually arranged evenly, if multiple magnetic poles arranged in the circumferential direction are configured exactly the same (permanent magnets arranged exactly the same), the relative positional relationship between one permanent magnet and one tooth would match the relative positional relationship between another permanent magnet and another tooth. Here, since harmonic components are higher-order frequency components that are "integer multiples" of a fundamental wave component having a certain frequency component, hence, if there are multiple pairs of permanent magnets and teeth with matching positional relationships, harmonic components, which are frequency components that are integer multiples, may be more likely to occur.

Therefore, in the above rotor structure, it may be permissible that the permanent magnets are inserted into magnet holes that axially penetrate the rotor core, and when viewed in the axial direction, at least one of a position, shape, size, and inclination of the permanent magnets, and the position, shape, size, and inclination of the magnet holes in each of the magnetic poles is set so as to be asymmetric between the magnetic poles adjacent in the circumferential direction.

According to this configuration, since at least one of the position, shape, size, and inclination of the permanent magnets and magnet holes (hereinafter also referred to as "position, etc.") is asymmetric between adjacent magnetic poles in the circumferential direction, it becomes possible to suppress cancellation out of harmonic components between adjacent magnetic poles and a significant change in the positional relationship between the teeth and the permanent magnets, for example, even when the rotor rotates, by adjusting the positions of the permanent magnets and magnet holes. This makes it possible to suppress a change in magnetic resistance, therefore, it is possible to reliably suppress torque ripple, thereby enabling the motor to be more efficient and to reduce vibration and noise, by the suppression of amplification of harmonic components based on the suppression of a change in magnetic resistance, combined with the cancellation of harmonic components.

However, if the positions of the permanent magnets are asymmetric between adjacent magnetic poles, there is a possibility that variations will occur in the amount of magnetic flux (fundamental wave component) contributing to the generation of torque between a magnetic pole composed of a relatively large permanent magnet and a magnetic pole composed of a relatively small permanent magnet.

Therefore, in the above rotor structure, it may be permissible that the first protrusion portion is formed so as to protrude relatively radially outward by recessing radially inward an outer peripheral surface of the rotor core corresponding to both circumferential ends of the first protrusion portion when viewed in the axial direction, and depths of the recesses at both circumferential ends of the first protrusion portion are set to be asymmetric.

In this configuration, the depth of the recesses at both circumferential ends of the first protrusion portion is set to be asymmetric, and if the depth of the recess at the end of the first protrusion portion is deep, the magnetic flux is difficult to pass through as if there were a large gap, while if the depth of the recess at the end of the first protrusion portion is shallow, the magnetic flux is easy to pass through as if there were a small gap. Therefore, by setting the deep end of the first protrusion portion to the magnetic pole side with a large amount of magnetic flux composed of a large permanent magnet, while setting the shallow end of the first protrusion portion to the magnetic pole side with a small amount of magnetic flux composed of a small permanent magnet, it is possible to reduce the variation in the amount of magnetic flux (fundamental wave component) due to the asymmetry between adjacent magnetic poles. In addition, by changing the depth of the recesses at both circumferential ends of the first protrusion portion, the zero cross point (the point where the polarity of the magnetic flux changes) is closer to the q axis, so that the variation in the amount of the fundamental wave components of the magnetic flux can be further reduced.

In addition, in the above rotor structure, it may be permissible that the permanent magnets are inserted into magnet holes that axially penetrate the rotor core, each of the magnetic poles includes two permanent magnets that are circumferentially adjacent within the magnet hole, and a space between the two adjacent permanent magnets is a second gap.

According to this configuration, since a space between the two adjacent permanent magnets is a second gap, in other words, the bridge portion that serves as a leakage flux path is not present between the two permanent magnets, therefore, it is possible to suppress short-circuit flux (leakage flux) that does not contribute to torque, and to effectively utilize the magnet flux. This makes it possible to obtain high torque even when the stator coil current is low, and therefore it is possible to more reliably achieve high efficiency in the motor.

However, since the bridge portion that was conventionally provided between two adjacent permanent magnets was intended to ensure mechanical strength, if a space between two adjacent permanent magnets is considered as a second gap (bridgeless), the stress acting on other parts in the vicinity of these permanent magnets (stress due to centrifugal force and shrink fitting) will increase relatively.

Therefore, in the above rotor structure, it may be permissible that an end of the magnet hole into which the two permanent magnets are inserted is close to an outer peripheral surface of the rotor core, and a third gap at that end that is not filled with the permanent magnet is separated by a bridge portion.

According to this configuration, double bridge portions: a bridge portion formed on the surface of the rotor core and a bridge portion which separates the third gap, are provided in the third gap not filled with a magnet at the end of the magnet hole, thus, this makes it possible to suppress stress concentration due to centrifugal force and shrink fitting, thereby preventing deformation of the rotor core.

Furthermore, in the above rotor structure, it may be permissible that when viewed in the axial direction, at least one of a position, shape, size, and inclination of the permanent magnet in each of the magnetic poles is set so as to be asymmetric between the magnetic poles adjacent in the circumferential direction, and a relative angle between the permanent magnet and the bridge portion is set so as to be asymmetric between the magnetic poles adjacent in the circumferential direction.

If the position and the like of the two permanent magnets are asymmetric between the magnetic poles, stress concentration is likely to occur near these permanent magnets, however, with this configuration, the relative angle between the permanent magnets and the bridge portion is also set so that it is asymmetric between the magnetic poles, therefore, depending on how the relative angle between the permanent magnets and the bridge portion is set, stress concentration due to asymmetry can be suppressed, thereby preventing deformation of the rotor core.

In addition, in the above rotor structure, it may be permissible that the permanent magnets are inserted into magnet holes that axially penetrate the rotor core, each of the magnetic poles comprises an outer magnet hole extending in the circumferential direction and formed in an outermost periphery of the rotor core, and an inner magnet hole extending in the circumferential direction and formed radially inward of the outer magnet hole, the inner magnet hole is formed in a shape such that a radially outer surface of the inner permanent magnet inserted into the inner magnet hole contacts the rotor core, and a radially inner portion not filled with the inner permanent magnet has a relatively large fourth gap, and the rotor core has a long and narrow squeezing section formed that circumferentially divides the fourth gap and extends radially through a d-axis of each magnetic pole so as to connect a portion of the rotor core that is radially inward of the inner permanent magnet when viewed in the axial direction to the inner permanent magnet.

According to this configuration, since the rotor core is formed in a shape having a relatively large fourth gap radially inward of the inner permanent magnet, for example, the magnetic flux coming from the radially outer surface of the inner permanent magnet that contacts the rotor core (magnetic body) is difficult to pass through the fourth gap. Therefore, the magnetic flux is concentrated in the squeezing section that divides the fourth gap and extends radially through the d-axis so as to connect the rotor core and the inner permanent magnet. However, since the squeezing section is formed long and thin, it immediately becomes magnetically saturated under light load (for example, under no load), and the magnetic permeability becomes very small and becomes close to a vacuum (gap), so that the radially inner surface of the inner permanent magnet is in a state similar to being completely covered with the fourth gap. In this way, the magnetic flux is suppressed by the magnetic saturation of the squeezing section, so that the iron loss under light load (under no load) can be reduced, and the efficiency of the motor can be further improved.

On the other hand, in general, when a synchronous motor having reverse saliency generates high torque (under heavy load), current advance control is performed to utilize reluctance torque. Here, since current advance control is approximately equal to field weakening control, the magnetic flux of the permanent magnet generated by such current advance control is suppressed by the magnetic flux component generated from the stator coil that opposes the magnetic flux of the permanent magnet. As a result, magnetic saturation of the squeezing section is eliminated, therefore, the magnetic flux of the permanent magnet that was limited by magnetic saturation can be effectively used for torque generation. This allows high torque to be obtained even with advance control (approximately field weakening control), thereby further improving the efficiency of the motor.

Therefore, with the simple structure of forming a squeezing section, it is possible to more reliably achieve high efficiency in the motor both under light load and heavy load.

Furthermore, in the above rotor structure, the rotor core may have a skew angle of 0 degrees.

This configuration can reliably suppress the decrease in average torque, the generation of axial thrust force, and the increase in iron loss that occur due to the rotor core having a skew angle. Thereby this makes it possible to more reliably achieve high efficiency and low vibration and noise in the motor.

In the above rotor structure, the magnet hole may be used as an oil passage for flowing a cooling oil.

With this configuration, the permanent magnets inserted into the magnet holes can be directly cooled by using the magnet holes as oil paths for the flow of a cooling oil. In this way, it is possible to more reliably prevent demagnetization of the permanent magnets when the synchronous motor is made smaller, by directly cooling the permanent magnets with the cooling oil combined with a decrease in the amount of heat generated inside the motor owing to the increased efficiency of the motor.

Advantageous Effect of the Invention

As described above, the rotor structure according to the present invention can achieve high efficiency, low vibration and low noise even when a synchronous motor is miniaturized.

DETAILED DESCRIPTION

Hereinafter, embodiments for carrying out the present invention will be explained with reference to the drawings.

—Motor Overview—

Figure 1:
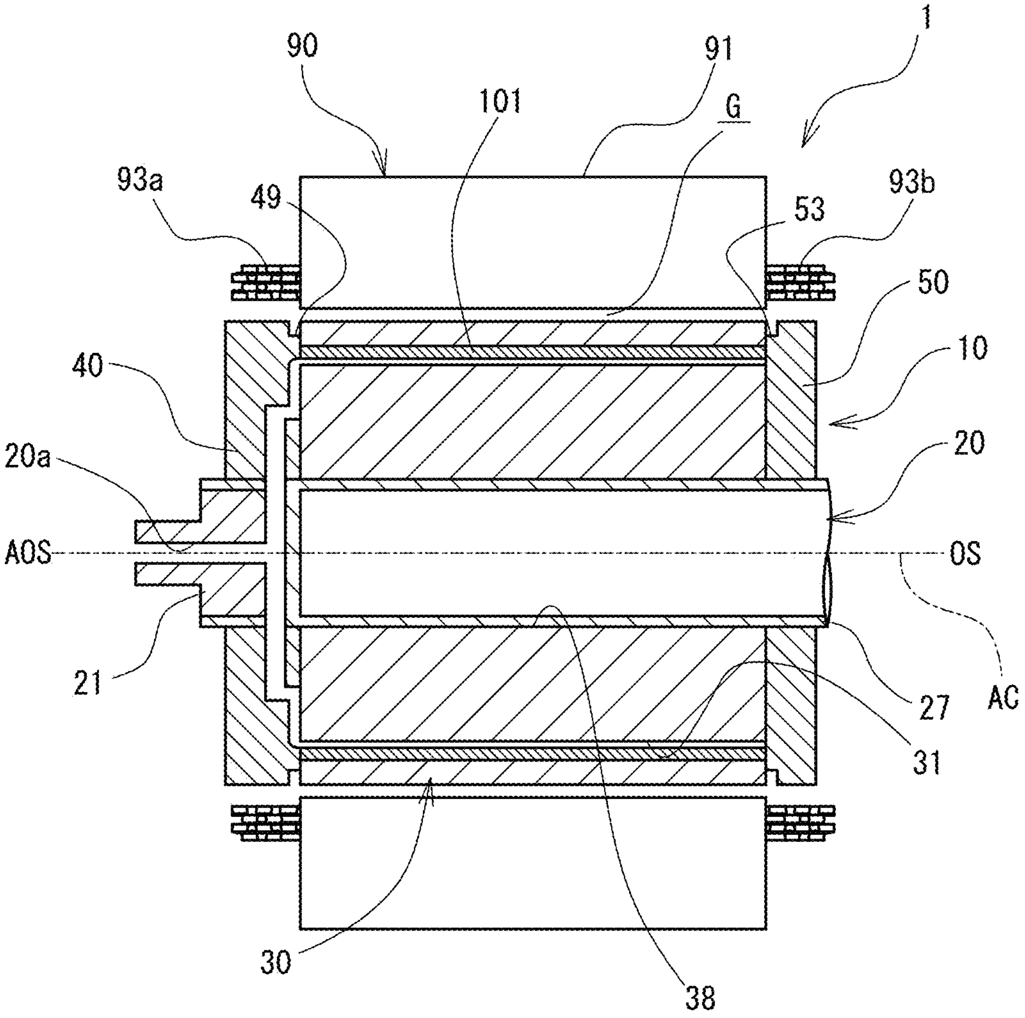
FIG. 1 is a vertical cross-sectional view schematically showing an outline of a synchronous motor according to an embodiment of the present invention.

FIG. 1 is a vertical cross-sectional view schematically showing an overview of a synchronous motor 1 according to this embodiment. In FIG. 1, the symbol AC indicates the axis center of the synchronous motor 1, the symbol OS indicates the output axis side, and the symbol AOS indicates the anti-output axis side, respectively. In addition, for the stator 90, a detailed cross section of the stator core 91 is not shown, and only the outer shape of the stator core 91 and the coil ends 93*a*, 93*b* of a stator coil 93 (see FIG. 4) attached to the stator core 91 are shown, in FIG. 1, in order to make the drawing easier to see. Note that FIG. 1 shows only an overview of the synchronous motor 1 and emphasis is placed on ease of understanding, therefore, the circumferential positions of each part in the rotor 10 are not necessarily aligned.

This synchronous motor 1 is mounted, for example, on an electric vehicle, and as shown in FIG. 1, is configured such that it comprises a rotor 10 having a rotor core 30 with a rotor shaft 20 passing through the center, and a stator 90 having a stator core 91 arranged so as to surround the outer periphery of the rotor core 30, and the rotor 10 rotates in synchronization with the rotating magnetic field generated by the stator 90. As will be described in more detail later, the synchronous motor 1 has a rotor structure that allows for high efficiency and low vibration and noise even when the motor is miniaturized.

—Rotor Overview—

Figure 2:
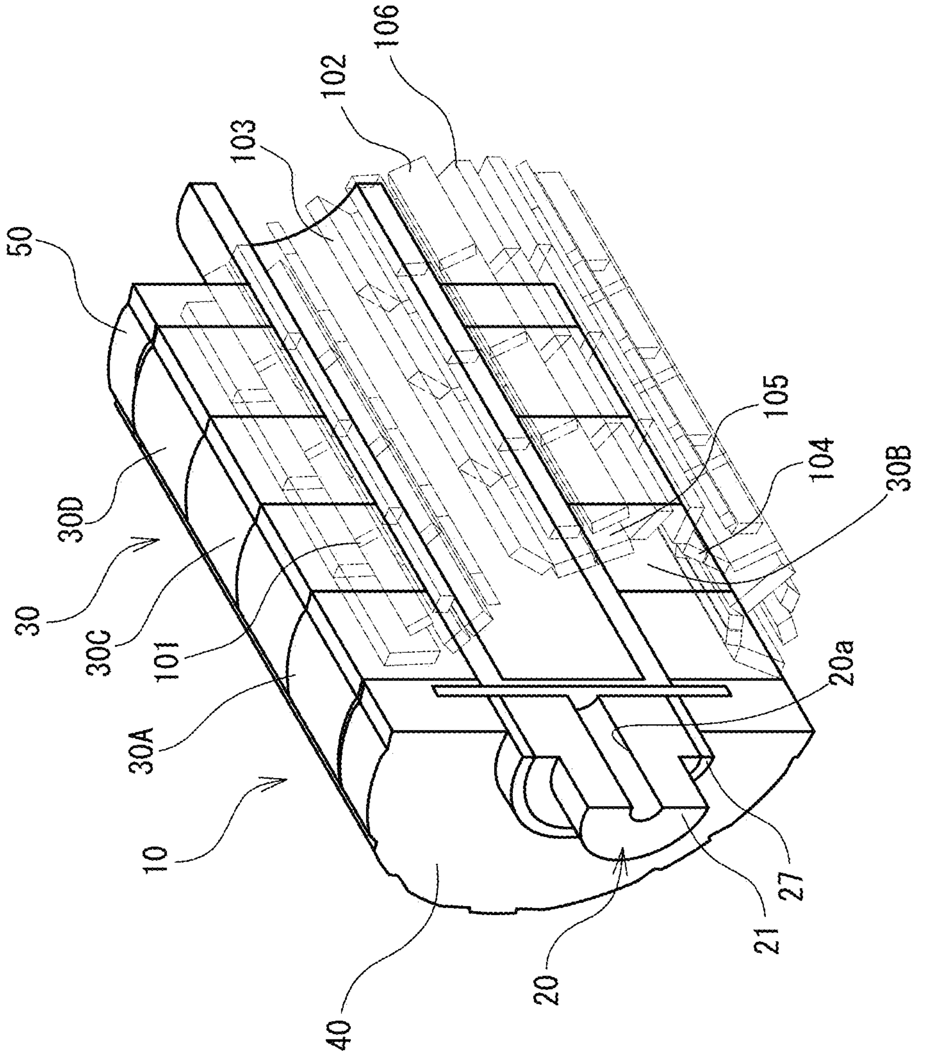
FIG. 2 is a perspective view schematically showing a rotor.

FIG. 2 is a perspective view schematically showing the rotor 10. As shown in FIG. 2, in addition to the rotor shaft 20 and rotor core 30 described above, the rotor 10 has permanent magnets 101, 102, 103, 104, 105, and 106 embedded in magnet holes 31 formed in the rotor core 30, and first and second end plates 40 and 50 attached to both ends of the rotor core 30 in the axial direction (the direction in which the axis center AC extends), respectively.

The rotor shaft 20 has an oil introduction portion 21 and a shaft main body portion 27, and an oil introduction passage 20*a* is formed therein through which a cooling oil flows. As shown in FIG. 1, the first end plate 40 is arranged to overlap with the coil end 93*a* on the anti-output axis side AOS in the axial direction (hereinafter simply referred to as the "anti-output axis side AOS"), and the second end plate 50 is arranged to overlap with the coil end 93*b* on the output axis side OS in the axial direction (hereinafter simply referred to as the "output axis side OS"), as viewed in the radial direction.

The rotor core 30 is a laminated body in which a predetermined number of annular magnetic thin plates formed into a predetermined shape are stacked in the axial direction, and is formed into a cylindrical shape having a central hole 38 to which the rotor shaft 20 is fixed by shrink fitting. More specifically, as shown in FIG. 2, the rotor core 30 is configured as a so-called skewless rotor core in which four laminated bodies 30A, 30B, 30C, and 30D, each of which is stacked with magnetic thin plates, are combined with a skew angle of 0 degrees. As a result, in this embodiment, a decrease in average torque and the generation of thrust force in the axial direction are suppressed. In addition, by making the rotor core 30 skewless, the magnet hole 31 and the permanent magnets 101, 102, - - - extend straight from the end of the rotor core 30 on the anti-output axis side AOS to the end of the output axis side OS in the axial direction. Note that an electromagnetic steel plate, which is a type of silicon steel plate, can be used as the material of the magnetic thin plates.

Figure 3A:
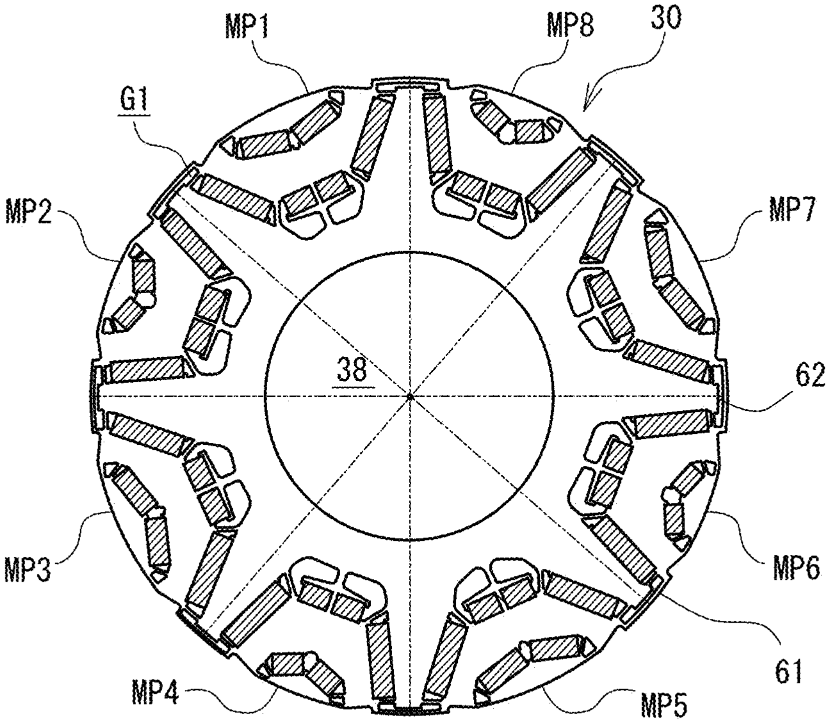
FIG. 3 A is an overall cross-sectional view schematically showing a rotor core and a permanent magnet.
FIG. 3B is an enlarged view of the magnetic pole in FIG. 3A.
Figure 3B:
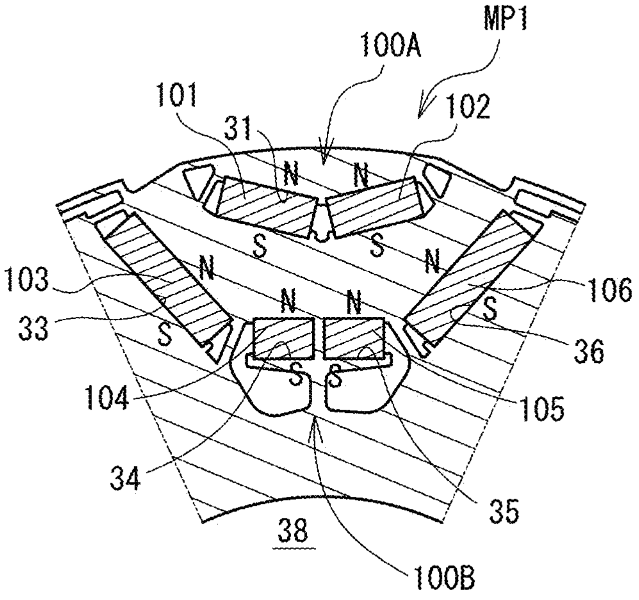

FIG. 3A is an overall cross-sectional view schematically showing the rotor core 30 and the permanent magnets 101, 102, - - - . FIG. 3B is an enlarged view of the magnetic pole MP1 in FIG. 3A. In FIG. 3A, cross-sectional hatching of the magnetic body is omitted to make the drawing easier to see. As shown in FIG. 3A, the rotor core 30 has the permanent magnets 101, 102, 103, 104, 105, and 106 embedded therein so that the number of magnetic poles arranged in the circumferential direction of the rotor 10 is eight, and the prospect angle of one magnetic pole along the circumferential direction as seen from the axis center AC is 45 degrees.

Although the positions and shapes of the magnet holes 31, 33, - - - and the permanent magnets 101, 102, - - - of the magnetic poles MP1, MP2, MP3, MP4, MP5, MP6, MP7, MP8 are different, the basic configuration is the same, therefore, in the following, the magnet holes 31, 33, - - - and the permanent magnets 101, 102, - - - and the like in each of magnetic poles MP1, MP2, - - - will be described with reference to the magnetic pole MP1 shown in the enlarged view of FIG. 3B as a representative of the eight magnetic poles MP1, MP2, - - -.

As shown in FIG. 3B, each magnetic pole MP1, MP2, - - - is constituted of a two-layer structure consisting of an outer embedded magnet section 100A including two permanent magnets 101, 102 arranged in a V-shape on the radially outer side, and an inner embedded magnet section 100B including four permanent magnets 103, 104, 105, 106 arranged in a U shape on the radially inner side.

The outer embedded magnet section 100A has one magnet hole 31 formed in a V shape, and the two permanent magnets 101, 102 are inserted into the magnet hole 31 so that the distance between them increases radially outward and decreases radially inward, forming a V shape. The portion of the V-shaped magnet hole 31 that is not filled with the two permanent magnets 101, 102, etc. (the white portion in FIG. 3B) remains as a gap (flux barrier).

The inner embedded magnet section 100B has four magnet holes 33, 34, 35, and 36. The permanent magnets 103 and 106 are inserted into the magnet holes 33 and 36, respectively, so that the distance between them increases toward the radially outward direction and decreases toward the radially inward direction. The portions of the magnet holes 33 and 36 that are not filled with the permanent magnets 103 and 106 remain as gaps. The permanent magnets 104 and 105 are inserted into the magnet holes 34 and 35, respectively, and the portions of the magnet holes 34 and 35 that are not filled with the permanent magnets 104, 105, etc. remain as gaps.

—Rotor Structure—

In this embodiment, as described above, the synchronous motor 1 is provided with a rotor structure that enables high efficiency and low vibration and noise even when the motor is miniaturized, and since the "efficiency" of a motor is "output/(output+loss)", it is necessary to increase the output while suppressing loss (requirement 1), in order to achieve high efficiency of the motor.

Here, since the "output" of a motor is "torque×rotation speed", in order to increase the output, it is necessary to increase the torque that can be generated by the same magnitude of stator coil current (requirement 2) and rotate the rotor 10 smoothly without waste. In order to increase the torque that can be generated, it is effective to increase the proportion of magnetic flux (fundamental wave component) that contributes to the generation of torque. In addition, in order to rotate the rotor 10 smoothly without waste, it is considered ideal to change the magnetic flux density in an air gap G between the stator 90 and the rotor 10 in each magnetic pole MP1, MP2, - - - of the rotor 10 in a sinusoidal manner over time (distributed in a sinusoidal manner in space) (requirement 3). If the magnetic flux density changes in a sinusoidal shape in an air gap G between the stator 90 and the rotor 10 in this way, torque ripple (vibration) is also suppressed, so that it is possible to achieve high efficiency and simultaneously low vibration and noise. However, it is generally known that in a synchronous motor 1, harmonic components that inhibit these requirements 1 to 3 are included in the magnetic flux.

<Existence of Harmonic Components>

Figure 4:
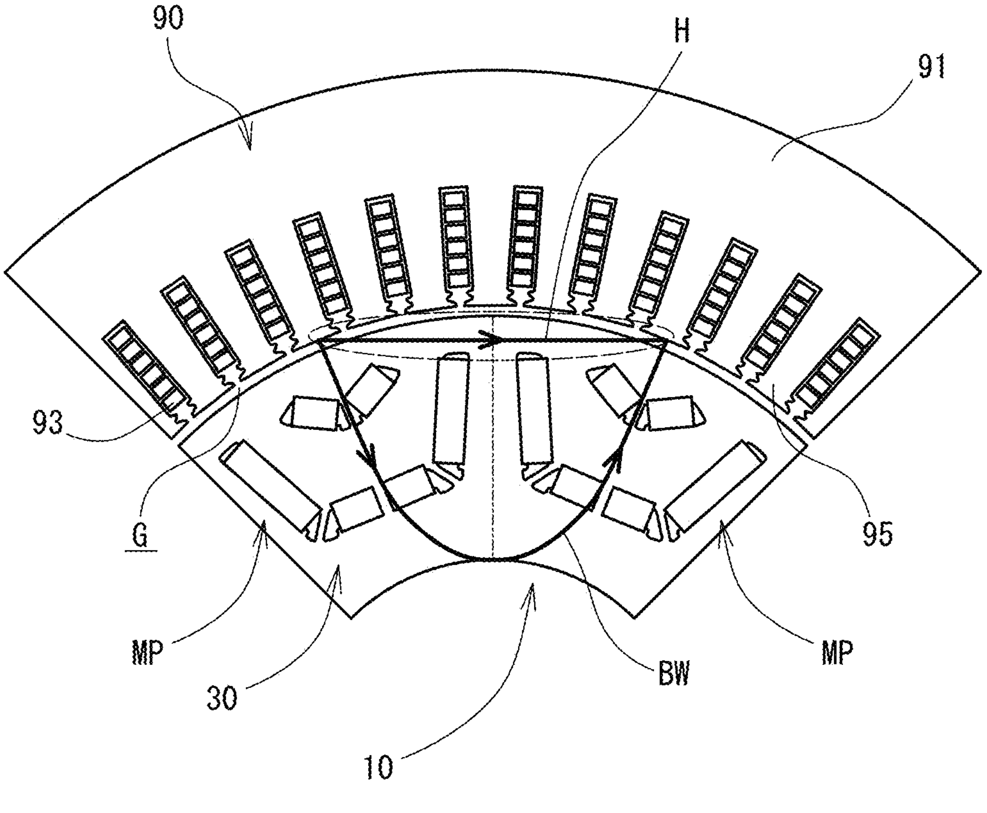
FIG. 4 is a view schematically explaining harmonic components.
Figure 5A:
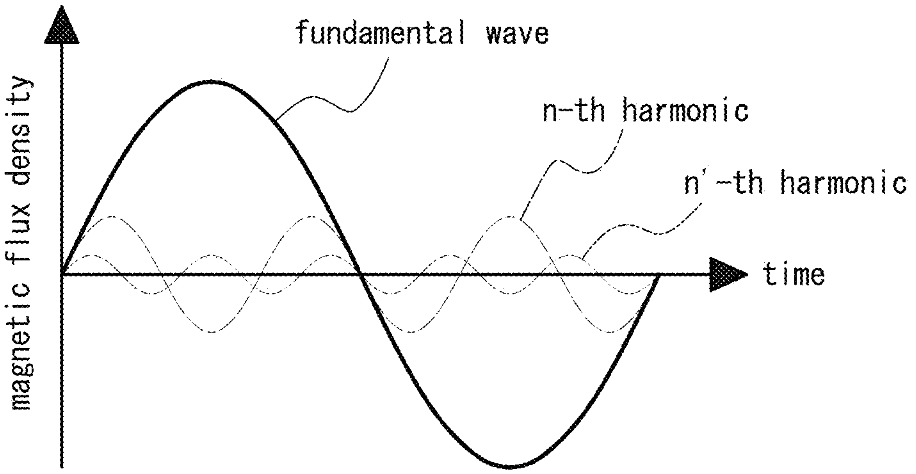
FIG. 5A is a view schematically explaining the effect of harmonic components on magnetic flux density where a fundamental wave and harmonics separated from each other.
Figure 5B:
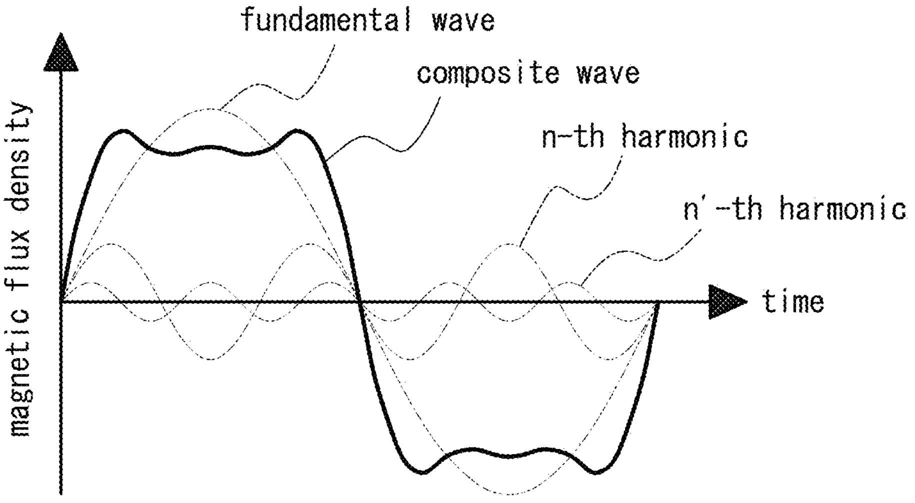
FIG. 5B is a view showing the composite wave of the fundamental wave and the harmonics.

FIG. 4 is a view schematically explaining the harmonic components. FIG. 5A is a view schematically explaining the influence of the harmonic components on the magnetic flux density where the fundamental wave and the harmonics separated from each other. FIG. 5B is a view showing the composite wave of the fundamental wave and the harmonics. The two-dot chain line in FIG. 4 is a virtual line that separates the magnetic poles MP. Furthermore, in FIG. 5A, the fundamental wave is shown by a solid line, the n-th harmonic by a dashed line, and the n'-th harmonic (n'>n) by a two-dot chain line.

The magnetic flux that contributes to the generation of torque is the magnetic flux that passes widely around the inside of the rotor core 30, as indicated by the symbol BW in FIG. 4, and is called a fundamental wave (fundamental wave component). On the other hand, a harmonic component is a high-order frequency component that is an "integer multiple" of the fundamental wave component, and is known to not contribute to the generation of torque because it passes through the outer periphery of the rotor core 30 as indicated by the symbol H in FIG. 4. In addition, it is known that the harmonic component is superimposed on the fundamental wave, which is ideally sinusoidally changing, as shown in FIG. 5A, and distorts the waveform of the magnetic flux density in an air gap G between the stator 90 and the rotor 10, as shown in FIG. 5B.

On the other hand, while "loss" means "iron loss+copper loss+mechanical loss," "loss" in the rotor 10, which is mainly made of a magnetic material, is "iron loss". This "iron loss" includes hysteresis loss (see formula (1) below), which is friction loss that occurs when changing the direction of the magnetic field, derived from Steinmetz's empirical formula, and eddy current loss (see formula (2) below), which is energy loss caused by the electrical resistance of the rotor core 30.

(Mathematical formula 1)

$$P_H = K_H \cdot f \cdot B_M^{1.6} \tag{1}$$

$K_H$: proportional constant
f: frequency (fluctuation frequency of magnetic flux)
$B_M$: maximum magnetic flux density (Mathematical formula 2)

$$P_e = K_e \cdot (t \cdot f \cdot B_M)^2 / \rho \tag{2}$$

$K_e$: proportional constant
t: iron plate thickness
f: frequency (fluctuation frequency of magnetic flux)
$B_M$: maximum magnetic flux density
ρ: resistivity of magnetic body As can be seen from the above formulae (1) and (2), hysteresis loss and eddy current loss, i.e., "iron loss," depend on the magnetic flux fluctuation frequency f, and increase as the magnetic flux fluctuation frequency f increases. Also, as shown in FIG. 5A, harmonic components have higher frequency components than the fundamental wave component. For this reason, the presence of harmonic components leads to an increase in iron loss, which also hinders the improvement of the efficiency of the synchronous motor 1.

It is known that such harmonic components tend to appear in an air gap G where magnetic exchange takes place between the rotor 10 and the stator 90, and between the magnetic poles MP where magnetic flux short circuits are likely to occur, in other words, in the vicinity of the magnetic poles MP on the outer periphery of the rotor core 30, as surrounded by the elliptical frame in FIG. 4.

Therefore, in this embodiment, an attempt is made to suppress the generation of harmonic components of the magnetic flux, which inhibits the improvement of efficiency and the reduction of vibration and noise of the synchronous motor 1. Below, detailed explanations will be given of the configurations ((1) the first gap and the protrusion portion, and (2) the asymmetric structure) for suppressing the generation of harmonic components of the magnetic flux to realize the improvement of efficiency and the reduction of vibration and noise, as well as the configurations ((3) the center bridgeless structure, (4) the squeezing section, and (5) the oil passage) that mainly aim to further improve the efficiency of the synchronous motor 1.

<(1) First Gap and Protrusion Portion>

Figure 6A:
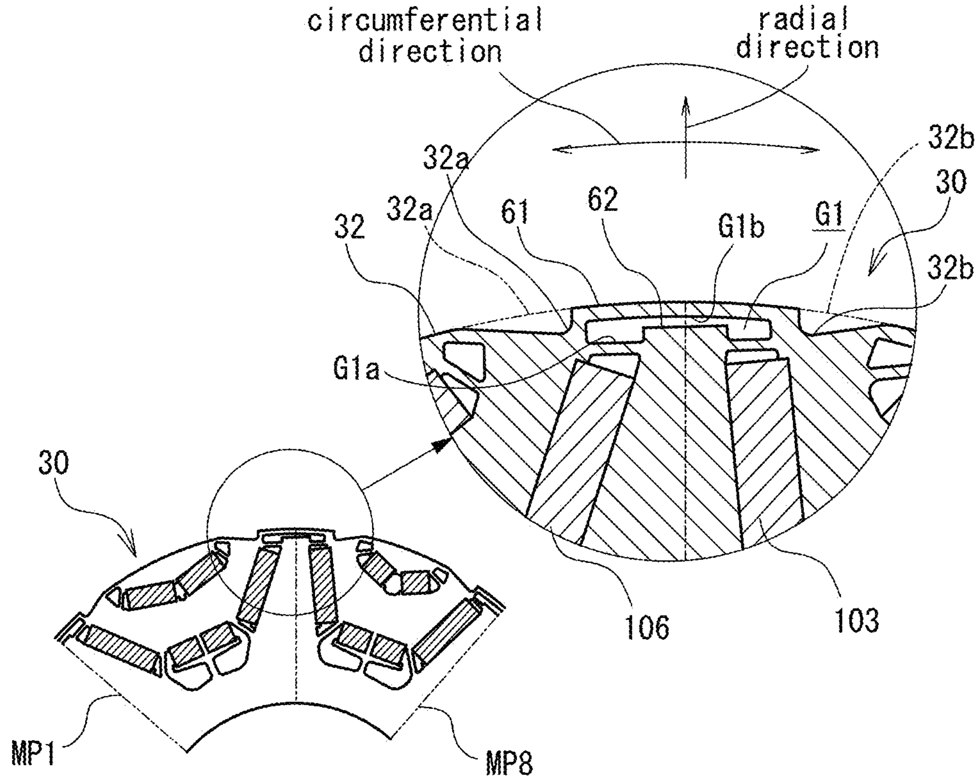
FIG. 6A is a cross-sectional view schematically showing magnetic poles and an enlarged view thereof for illustrating a first gap and a protrusion portion.
Figure 6B:
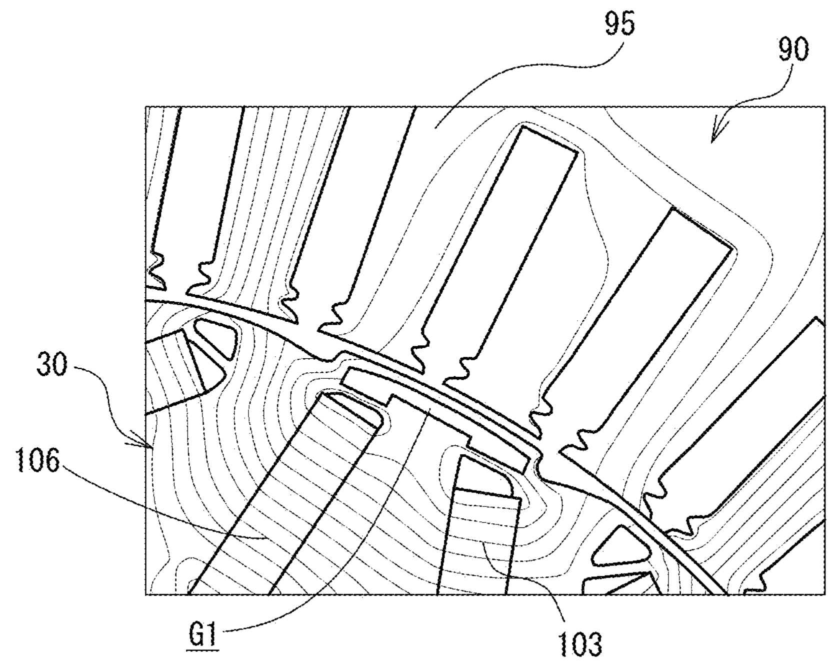
FIG. 6B is a view schematically showing the effect of the first gap.

FIG. 6A is a cross-sectional view schematically showing the magnetic pole MP1 and the magnetic pole MP8 and an enlarged view thereof for illustrating the first gap G1 and the protrusion portions 61, 62. FIG. 6B is a view schematically showing the effect of the first gap G1. In the rotor structure of this embodiment, as shown in FIG. 6A, the first protrusion portion 61 is formed on the outer peripheral surface 32 of the rotor core 30, which extends in the circumferential direction so as to straddle the adjacent magnetic poles MP1 and MP8 when viewed in the axial direction and protrudes radially outward, and the first gap G1 is formed inside the first protrusion portion 61, which extends in the circumferential direction when viewed in the axial direction. Note that the protrusion portions 61, 62 and the first gap G1 are formed not only between the magnetic poles MP1 and MP8, but also between all the magnetic poles MP adjacent to each other in the circumferential direction, as shown in FIG. 3A and FIG. 3B, for example.

As can be seen by comparing the imaginary lines (two-dot chain lines) and solid lines both indicated by the reference characters 32*a* and 32*b* in the enlarged view of FIG. 6A when viewed in the axial direction, the first protrusion portion 61 is formed so as to protrude relatively radially outward by recessing the outer peripheral surfaces 32*a* and 32*b* (imaginary lines) of the rotor core 30 corresponding to both ends in the circumferential direction inward in the radial direction (recesses 32*a* and 32*b* (solid lines)). In other words, the first protrusion portion 61 does not absolutely protrude radially outward from the outer peripheral surface 32 of the cylindrical rotor core 30, but protrude radially outward relatively to the recesses 32*a* and 32*b* by recessing both ends in the radial direction inward. In addition, the first gap G1 is formed in a rectangular cross section, but is formed in a U-shape that opens radially inward by forming the second protrusion portion 62 described later.

In this way, by forming the first gap G1 extending in the circumferential direction inside the first protrusion portion 61 formed so as to straddle the adjacent magnetic poles MP1 and MP8, as shown in FIG. 6B, the magnetic flux is blocked by the first gap G1 which is a flux barrier, and the short circuit of the magnetic flux between the magnetic poles MP1 and MP8 is suppressed, so that the generation of harmonic components can be suppressed. In this way, the generation of harmonic components having high frequency components is suppressed, so that the fluctuation frequency of the magnetic flux can be lowered, and thus the increase in iron loss depending on the fluctuation frequency of the magnetic flux can be suppressed (requirement 1 is satisfied). In this way, the suppression of the increase in iron loss by suppressing such harmonic components and the suppression of the increase in iron loss by the skewless rotor core 30 work together to reliably suppress the increase in loss. In addition, by suppressing the increase in loss, it is possible to reduce the amount of heat generated inside the motor even when the synchronous motor 1 is made smaller.

Furthermore, by suppressing the generation of harmonic components, the generation of a composite wave as shown in FIG. 5B is suppressed, so that the magnetic flux density in an air gap G between the stator 90 and the rotor 10 can be made closer to an ideal sinusoidal wave (requirement 3 is satisfied). This allows the rotor 10 to rotate smoothly without waste, and vibration (torque ripple) can be reduced. In addition, by suppressing the generation of harmonic components of the magnetic flux that do not contribute to the generation of torque by the first gap G1, the proportion of the fundamental wave components of the magnetic flux that contributes to the generation of torque can be increased.

However, simply forming the first gap G1 may result in a decrease in torque, and in that case, it is expected that the effect of increasing the total torque will be small even if the proportion of the fundamental wave components of the magnetic flux is increased.

Therefore, in the rotor structure of this embodiment, as shown in FIG. 6A, a second protrusion portion 62 having a rectangular cross section is formed inside the first protrusion portion 61, protruding radially outward from a portion G1*a* that defines the radially inner side of the first gap G1 when viewed in the axial direction. Here, the saliency means that the magnetic resistance (reluctance) is not uniform depending on the position on the circumference of the rotor core 30, and since the second protrusion portion 62 protruding radially outward is formed inside the first protrusion portion 61 formed on the outer circumferential surface 32 of the rotor core 30, the torque reduction can be compensated for by the reluctance torque generated by the attraction force between the poles and the salient poles (the first and second protrusion portions 61, 62) due to the rotating magnetic field of the stator 90. In this way, the torque that can be generated by the same magnitude of stator coil current can be increased (requirement 2 is satisfied) by combining the securing of reluctance torque due to magnetic saliency and the increase in the ratio of the fundamental wave components of the magnetic flux described above.

Figure 7C:
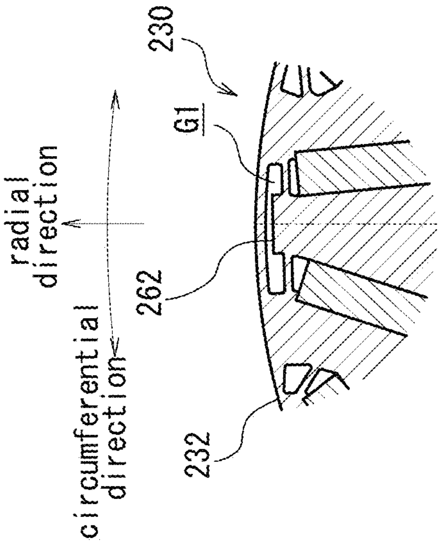
FIG. 7C shows a rotor core having only a second protrusion portion.
Figure 7B:
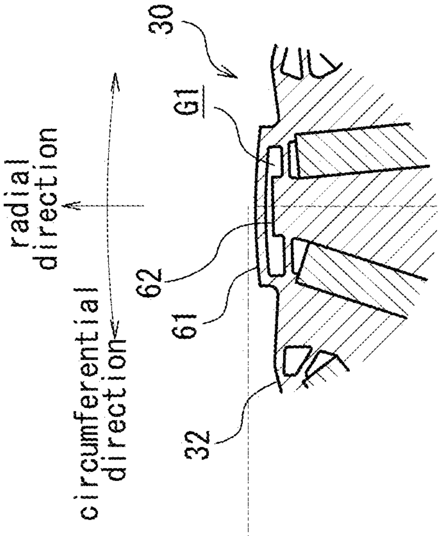
FIG. 7B shows a rotor core of the present embodiment having the first and second protrusion portions for explaining the advantage of the double protrusion portions.
Figure 7A:
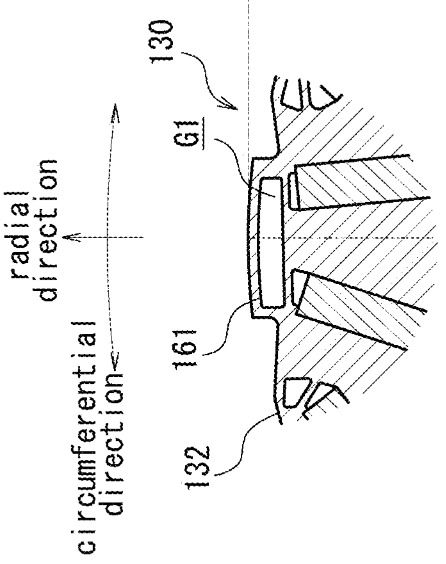
FIG. 7A shows a rotor core having only a first protrusion portion.

FIG. 7A shows a rotor core 130 having only the first protrusion portion 161. FIG. 7B shows a rotor core 30 of the present embodiment having the first and second protrusion portions 61 and 62 for explaining the advantage of the double protrusion portions 61,62. FIG. 7C shows a rotor core 230 having only the second protrusion portion 262. In the rotor structure of the present embodiment, the first and second protrusion portions 61 and 62, that is, the double protrusion portions 61 and 62 arranged in the radial direction, are formed, therefore, when generating an equivalent reluctance torque, for example, the protruding height of the first protrusion portion 61 itself to the outside in the radial direction can be reduced compared to the rotor core 130 having only the first protrusion portion 161 as shown in FIG. 7A (see the two-dot chain line between FIG. 7A and FIG. 7B). In other words, if the protruding height of the first protrusion portion 161 from the outer peripheral surface 132 is the same as the protruding height of the first protrusion portion 61 from the outer peripheral surface 32, the rotor core 30 of this embodiment can ensure a greater reluctance torque than the rotor core 130 in which only the first protrusion portion 161 is formed.

In this way, by setting the radially outward protruding height of the first protrusion portion 61 low, it is possible to make the outer peripheral surface 32 of the cylindrical rotor core 30 closer to a perfect circle, so that it is possible to reduce the cogging torque even when a skewless rotor core 30 is adopted. Moreover, since the first protrusion portion 61 is made to protrude relatively, rather than absolutely, radially outward as described above, it is possible to further reduce the cogging torque. Therefore, the reduction in the cogging torque combined with the reduction in the torque ripple described above makes it possible to reliably suppress motor vibration and the associated noise, even when the current density and magnetic flux density are increased in miniaturizing the synchronous motor 1.

Furthermore, in the rotor structure of this embodiment, since the double protrusion portions 61, 62 are formed aligned in the radial direction, it is possible to ensure a greater reluctance torque compared to a rotor core 230 in which the outer circumferential surface 232 has no unevenness and only the second protrusion portion 262 is formed, as shown in FIG. 7C.

Figure 8A:
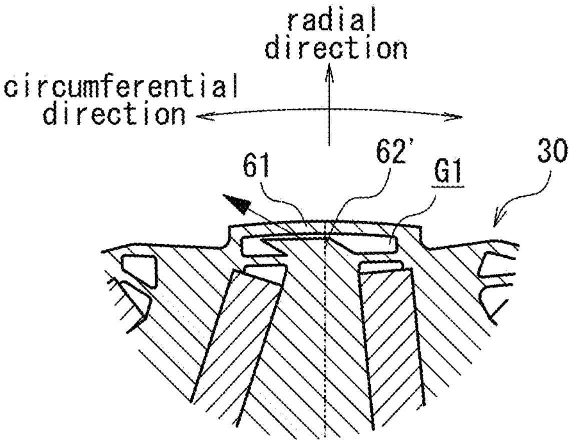
FIG. 8A is a view schematically showing a variation of the second protrusion portion.
Figure 8B:
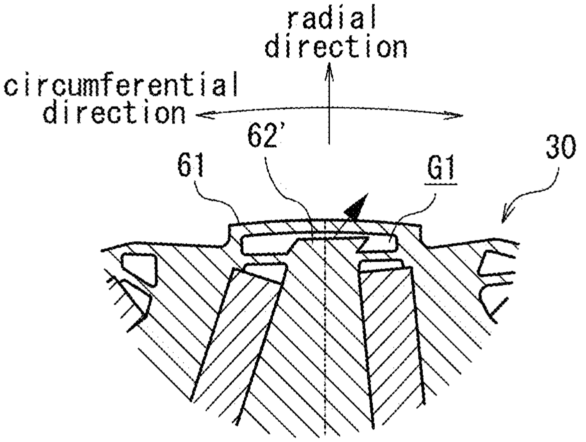
FIG. 8B is a view schematically showing a variation of the second protrusion portion.
Figure 8C:
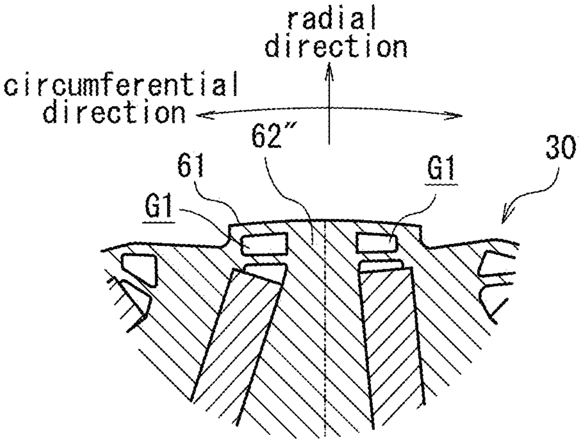
FIG. 8C is a view schematically showing a variation of the second protrusion portion.

FIG. 8A, FIG. 8B and FIG. 8C are views schematically showing variations of the second protrusion portion 62, respectively. In FIG. 8A and FIG. 8B, the second protrusion portion 62' is extremely inclined for convenience of explanation. As long as the second protrusion portion 62 protrudes radially outward from the portion G1*a* that defines the radially inner side of the first gap G1, it is not essential that the second protrusion portion 62 extends straight outward in the radial direction. For example, the second protrusion portion 62' may be protruded at an incline with respect to the radial direction so that the more it goes radially outward, the more it inclines at a prescribed angle in the circumferential direction (counterclockwise side in FIG. 8A), as shown in FIG. 8A, or the second protrusion portion 62' may be protruded at an incline with respect to the radial direction so that the more it goes radially outward, the more it inclines at a prescribed angle in the circumferential direction (clockwise side in FIG. 8B), as shown in FIG. 8B. In this manner, if the second protrusion portion 62' contributing to the magnetic saliency is made to protrude at an incline with respect to the radial direction so that it is inclined at a predetermined angle in the circumferential direction as it moves radially outward, it becomes possible to finely control the ripple components (harmonic components) of the reluctance torque by setting the predetermined angle.

Furthermore, as long as the second protrusion portion 62 protrudes radially outward from a portion G1*a* that defines the radially inner side of the first gap G1, the first gap G1 does not need to be a circumferentially continuous gap. For example, as shown in FIG. 8C, the second protrusion portion 62" may be protruded so as to divide the first gap G1 in the circumferential direction, and extend to a portion G1*b* that defines the radially outer side of the first gap G1. In this way, even if the first gap G1 is divided in the circumferential direction, it is possible to suppress the generation of harmonic components, and the protruding length of the second protrusion portion 62" can be made longer compared to the case where the second protrusion portion 62 is formed so as not to reach the portion G1*b*. This makes it possible to further ensure reluctance torque due to magnetic saliency.

As described above, according to the rotor structure of this embodiment, even when the synchronous motor 1 is miniaturized, it is possible to achieve high efficiency and low vibration and noise, and therefore, it is possible to achieve miniaturization of the synchronous motor 1 while maintaining the output level, without demagnetization of the permanent magnets 101, 102, - - - due to high temperatures or vibration and noise.

<(2) Asymmetric Structure>

As mentioned above, the harmonic components contained in the rotating magnetic field of the stator 90 and the magnetomotive force of the rotor 10 are the cause of torque ripple, but as explained below, "changes in magnetic resistance" are known to amplify such harmonic components. In the first place, the torque ripple is a concept that represents periodic fluctuations in torque output caused by the torque generated by a motor losing consistency. Thus, the torque T of a motor is defined by the following formula (3) (basic torque formula):

(Mathematical formula 3)

$$T = P_n \cdot (\varphi_a \cdot i_q + (L_d - L_q) \cdot i_d \cdot i_q) \quad (3)$$

$P_n$: number of pole pair
$\varphi_a$: magnetic interlinkage flux
$i_d$: d-axis current
$i_q$: q-axis current $L_d$: d-axis inductance $L_q$: q-axis inductance In the formula (3), L·i (the product of inductance and current) indicates the interlinkage magnetic flux generated by the stator coil current, and by transforming the formula (3), the torque T can be expressed as an formula of the interlinkage magnetic flux φ and current i, as shown in the following formula (4).

(Mathematical formula 4)

$$T = P_n \cdot (\varphi_d \cdot i_q - \varphi_q \cdot i_d) \quad (4)$$

$\varphi_d$: $\varphi_a + L_d \cdot i_d$ $\varphi_q$: $L_q \cdot i_q$

As can be seen from the formula (4), a state in which torque ripple exists refers to a state in which the interlinkage magnetic flux φ or the current i contains ripple components (harmonic components). If the current ($i_d$ or $i_q$) is constant, the main cause of torque ripple is the magnetic flux ($\varphi_d$ or $\varphi_q$), which is a function of inductance ($L_d$ or $L_q$), and since inductance is a function of magnetic resistance, a change in magnetic resistance amplifies the harmonic components in the magnetic flux, thereby worsening the torque ripple.

Figure 9A:
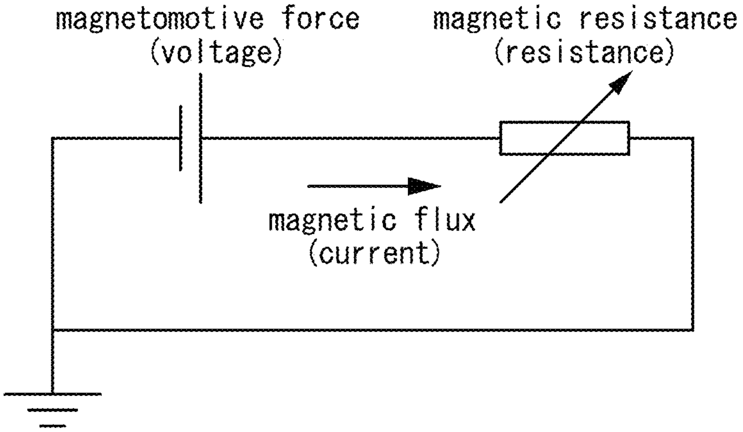
FIG. 9A is a view schematically explaining a magnetic equivalent circuit.
Figure 9B:
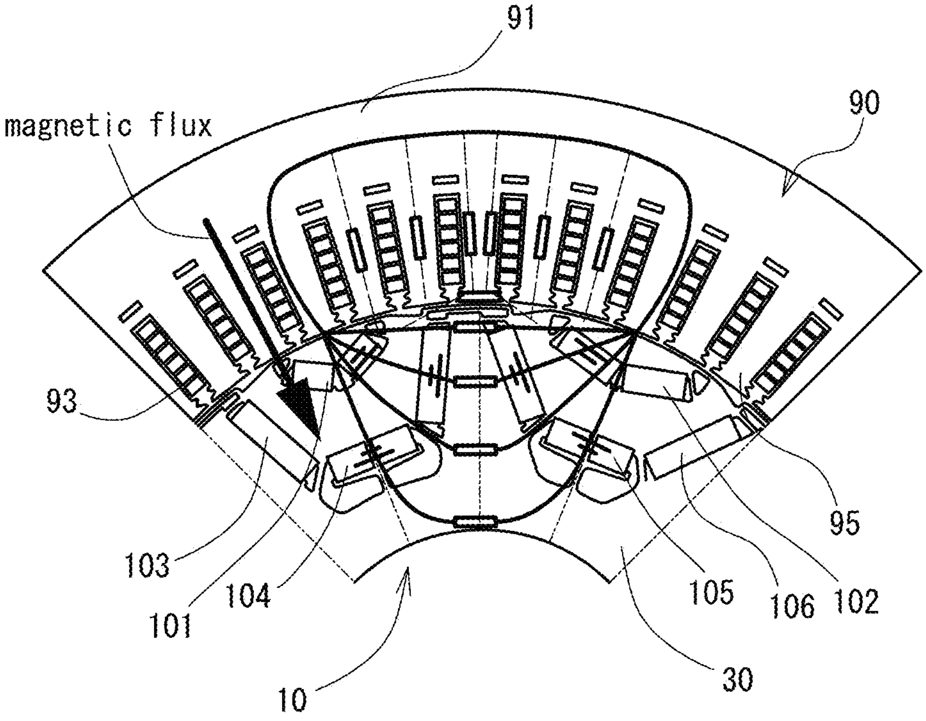
FIG. 9B shows an image of a magnetic equivalent circuit network.
Figure 10A:
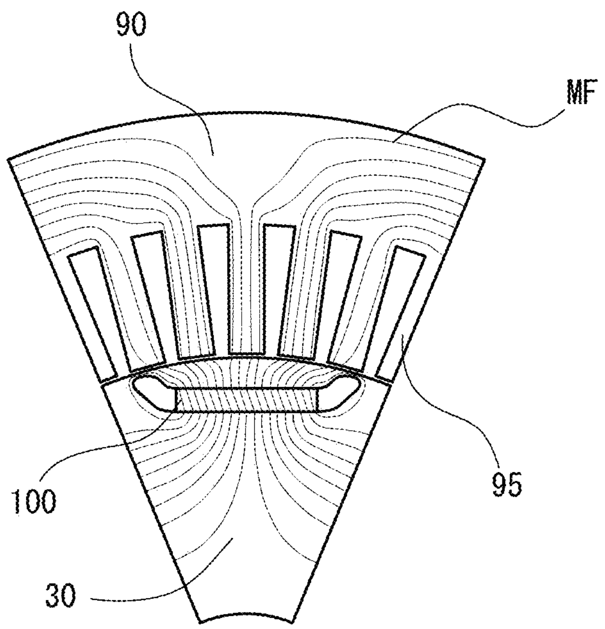
FIG. 10A is a view schematically explaining a typical change in magnetic resistance.
Figure 10B:
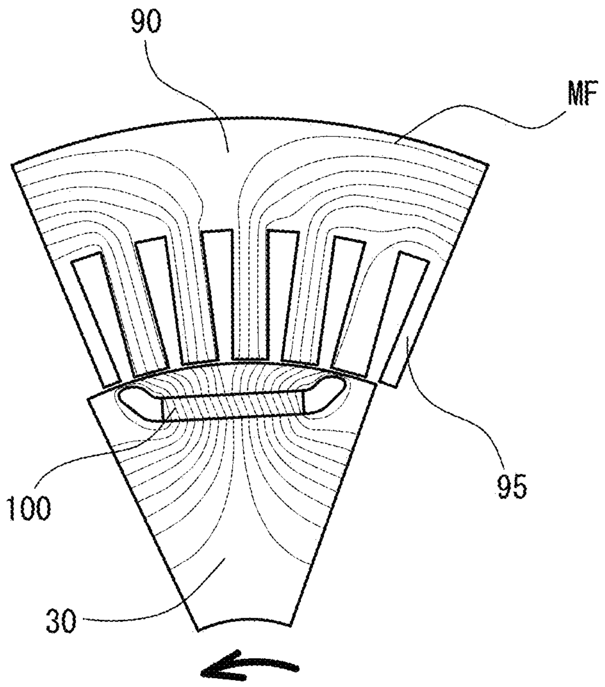
FIG. 10B is a view schematically explaining a typical change in magnetic resistance.
Figure 11:
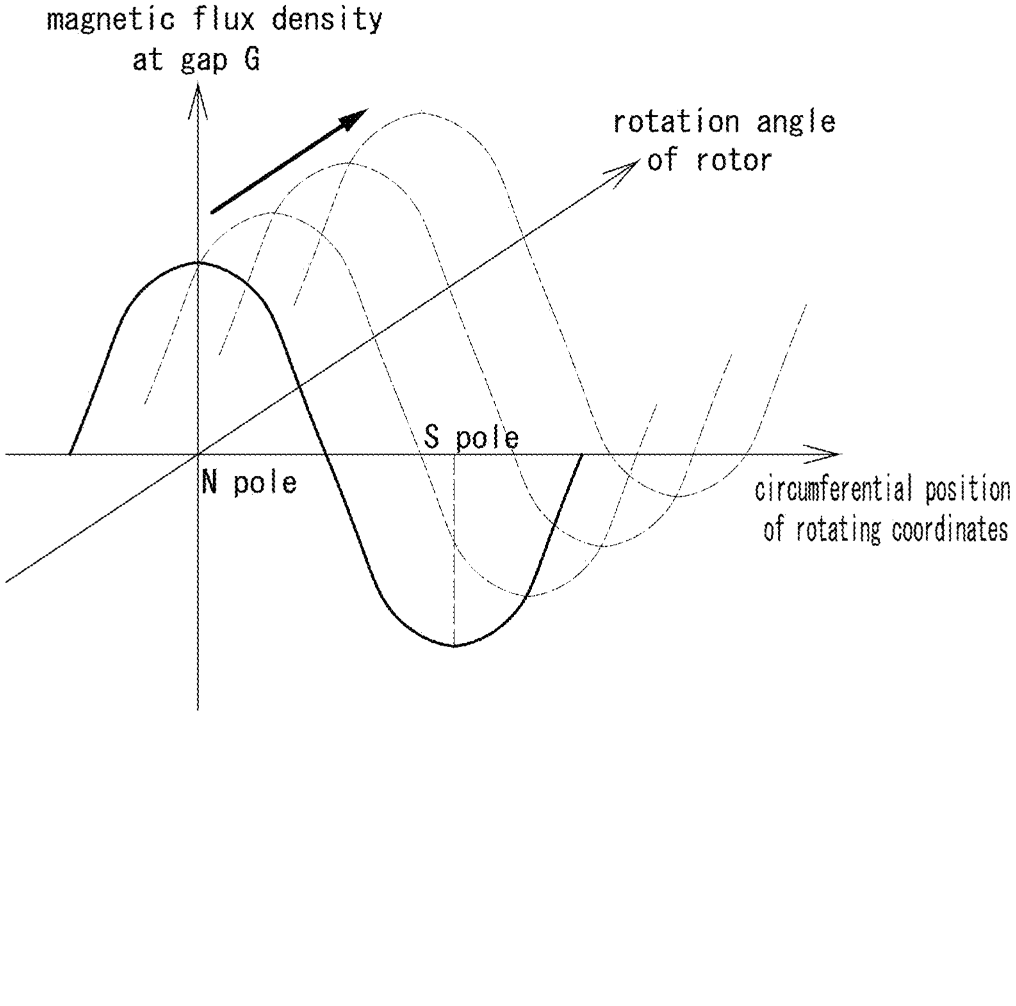
FIG. 11 is a view schematically explaining an ideal spatial distribution of magnetic flux density in an air gap between the stator and rotor.

FIG. 9A is a view for schematically explaining a magnetic equivalent circuit. FIG. 9B shows an image of a magnetic equivalent circuit network. FIG. 10A and FIG. 10B are views schematically explaining a typical change in magnetic resistance, respectively. is a view schematically explaining a typical change in magnetic resistance. is a view for schematically explaining a general change in magnetic resistance. FIG. 11 is a view for schematically explaining an ideal spatial distribution of magnetic flux density in an air gap G between the stator 90 and the rotor 10.

As shown in FIG. 9A, the magnetic equivalent circuit is used to explain the relationship between magnetic flux, magnetomotive force, and magnetic resistance by replacing it with the relationship between current, voltage, and resistance. Here, the "magnetomotive force" is a force that generates magnetic flux in a magnetic circuit, and corresponds to the permanent magnets 101, 102, - - - and the stator coil 93. The "magnetic resistance" is determined by the shape of the rotor core 30 and the shapes and arrangement of the flux barriers and permanent magnets 101, 102, - - - , and changes according to the rotation angle of the rotor 10 and the operating state of the synchronous motor 1 (change in magnetic permeability due to magnetic saturation). Therefore, in the synchronous motor 1, the flow of magnetic flux is determined by the distribution of the magnitude and direction of the magnetomotive force (the size and direction of the permanent magnets 101, 102, - - - , etc.) and the magnetic resistance (the shape and arrangement of the flux barriers, etc.), as shown by the thick arrow in FIG. 9B.

However, even if the flow of the magnetic flux MF is fixed as shown in FIG. 10A, as the rotor 10 rotates, the positional relationship between the teeth 95 of the stator 90 and the permanent magnets 100, etc. changes, as shown by the thick arrow in FIG. 10B, and as can be seen by comparing FIG. 10A and FIG. 10B, the flow of the magnetic flux MF changes. Depending on the arrangement of the permanent magnets 101, 102, - - - and flux barriers at the magnetic poles MP1, MP2, - - - of the rotor 10, the positional relationship between the teeth 95 of the stator 90 and the permanent magnets 101, 102, - - - etc. changes as the rotor 10 rotates, which may cause a large change in magnetic resistance, in which case harmonic components may be amplified and the torque ripple may worsen.

Therefore, an ideal magnetic flux density state in an air gap G between the stator 90 and the rotor 10 means a state in which the magnetic flux density does not simply change sinusoidally so that the magnetic flux density is maximum at the N pole and minimum at the S pole, but in which the magnetic flux density in an air gap G is always distributed sinusoidally at any rotation angle even if the rotation angle of the rotor 10 changes (the rotor 10 rotates), as shown by the thick arrow in FIG. 11. In other words, with a focus on torque ripple, if the change in magnetic resistance can be suppressed even if the rotation angle of the rotor 10 changes, the amplification of harmonic components can be suppressed, and torque ripple can be effectively suppressed.

Therefore, in the rotor structure of this embodiment, at least one of the position, shape, size, and inclination of the permanent magnets 101, 102, 103, 104, 105, 106 and the position, shape, size, and inclination of the magnet holes 31, 33, 34, 35, 36 in each of the magnetic poles MP1, MP2, - - - is set so as to be asymmetric, when viewed in the axial direction, between adjacent magnetic poles in the circumferential direction.

Figure 12A:
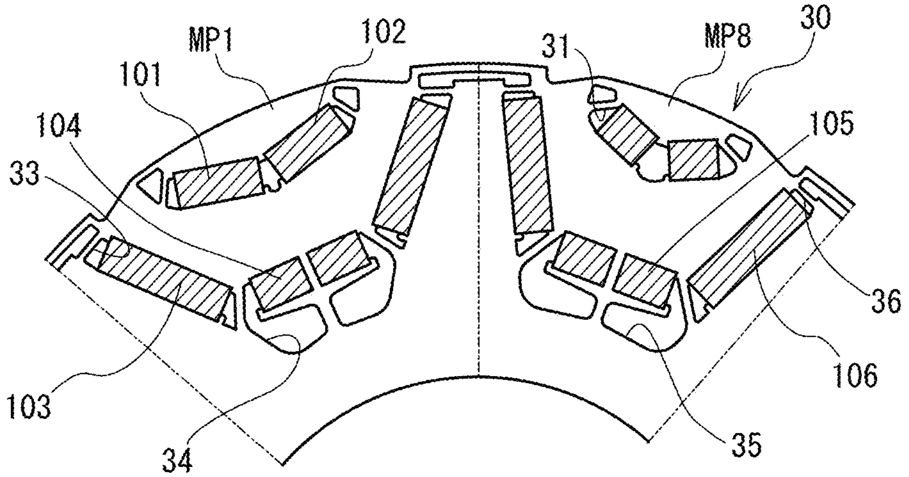
FIG. 12A is a cross-sectional view schematically showing an example of adjacent magnetic poles that are desymmetrized.
Figure 12B:
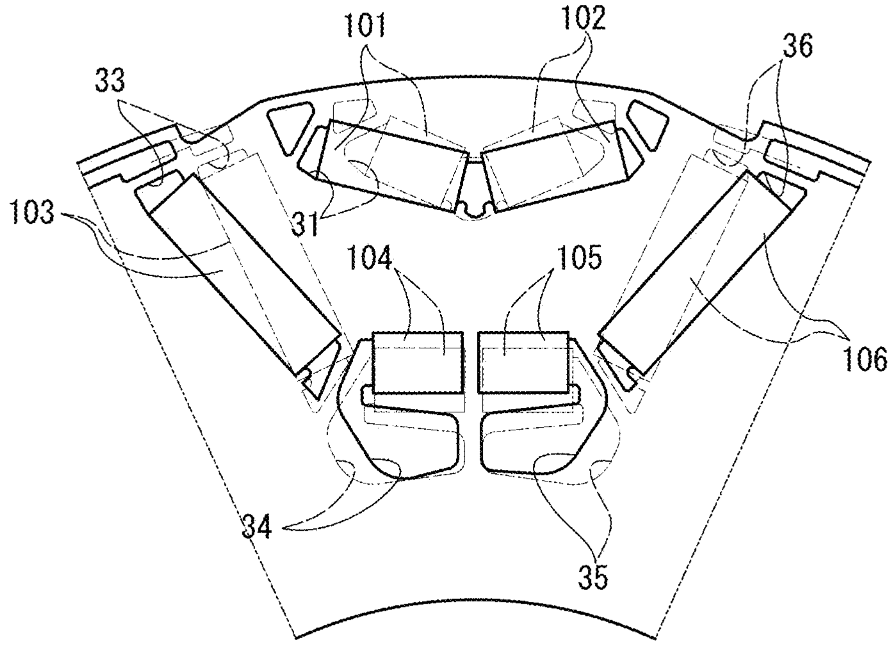
FIG. 12B shows a virtual state in which magnetic poles are overlapped.

FIG. 12A is a cross-sectional view schematically showing an example of adjacent magnetic poles MP1 and MP8 that are made asymmetric. FIG. 12B shows a virtual state in which magnetic poles MP1 and MP8 are overlapped. In FIG. 12A, cross-sectional hatching of the magnetic body is omitted to make the figure easier to see. Note that FIG. 12A and FIG. 12B are examples, and not only magnetic poles MP1 and MP8 are asymmetric, but all magnetic poles MP1, MP2, - - - adjacent to each other in the circumferential direction are made asymmetric, as shown in FIG. 3A, for example.

It can be seen that when magnetic poles MP1 and MP8 are superimposed as shown in FIG. 12B, the following elements are asymmetric between magnetic poles MP1 and MP8, which are adjacent to each other in the circumferential direction shown in FIG. 12A. That is, magnetic poles MP1 and MP8 are significantly different from each other in the size and inclination of permanent magnets 101 and 102, the inclination of permanent magnets 103 and 106, the positions of permanent magnets 104 and 105, the size and shape of magnet hole 31, the size, shape and inclination of magnet holes 33 and 36, and the size and shape of magnet holes 34 and 35.

Note that it is not sufficient that at least one of the position, shape, size, and inclination (hereinafter also referred to as "position, etc.") of the permanent magnets 101, 102, - - - and the magnet holes 31, 33, - - - be asymmetric between circumferentially adjacent magnetic poles; as explained above, it is required that the positions, etc. of the permanent magnets 101, 102, - - - and the magnet holes 31, 33, - - - be asymmetric so that changes in magnetic resistance can be suppressed even if the rotation angle of the rotor 10 changes. However, asymmetry that can suppress changes in magnetic resistance cannot be simply prescribed, for example, by "making the permanent magnet 101 larger and changing the shape of the magnet hole 31" but is set through simulation analysis and experiments using CAE (computer-aided engineering) while taking into account the relationship between the teeth 95, etc.

In this way, by making the position, etc. of the permanent magnets 101, 102, - - - and the magnet holes 31, 33, - - - asymmetric between circumferentially adjacent magnetic poles, it is possible to prevent the positional relationship between the teeth 95 and the permanent magnets 101, 102, - - - etc. from changing significantly even when the rotor 10 rotates. This makes it possible to suppress changes in magnetic resistance, suppress amplification of harmonic components, and suppress deterioration of torque ripple.

Furthermore, since the teeth 95 are usually arranged evenly, if the multiple magnetic poles MP1, MP2, - - - arranged in the circumferential direction were configured to be exactly the same, the relative positional relationship between one permanent magnet 101, 102, - - - and one tooth 95 would match the relative positional relationship between the other permanent magnets 101, 102, - - - and the other teeth 95. If there are multiple pairs of such permanent magnets 101, 102, - - - and teeth 95 in which the positional relationships match, harmonic components, which are integer multiple frequency components, may be more likely to be generated, but in this embodiment, by making adjacent magnetic poles asymmetric, it is also possible to cancel out the harmonic components between adjacent magnetic poles.

Therefore, by making the permanent magnets 101, 102, - - - and the magnet holes 31, 33, - - - asymmetric between adjacent magnetic poles MP1, MP8 in the circumferential direction, the amplification of harmonic components is suppressed by suppressing changes in magnetic resistance, combined with cancelling out of the harmonic components from each other, which reliably suppresses torque ripple and further improves the efficiency and reduces vibration and noise of the synchronous motor 1.

However, if the positions of the permanent magnets 101, 102, - - - and the magnet holes 31, 33, - - - are asymmetric between the adjacent magnetic poles MP1, MP8, there is a possibility that the amount of magnetic flux (fundamental wave component) contributing to the generation of torque will vary between the magnetic pole MP1 formed by the relatively large permanent magnets 101, 102 and the magnetic pole MP8 formed by the relatively small permanent magnets 101, 102. In addition, if the position, etc. of the permanent magnets 101, 102, - - - and the magnet holes 31, 33, - - - are asymmetric between the adjacent magnetic poles MP1, MP8, there is a possibility that the zero cross point of the fundamental wave components of the magnetic flux will be shifted from the q-axis.

Therefore, if the adjacent magnetic poles MP1, MP8 are to be desymmetrized, it is preferable to set the depths of the recesses 32*a*, 32*b* at both circumferential ends of the first protrusion portion 61 so as to be asymmetrical.

Figure 13A:
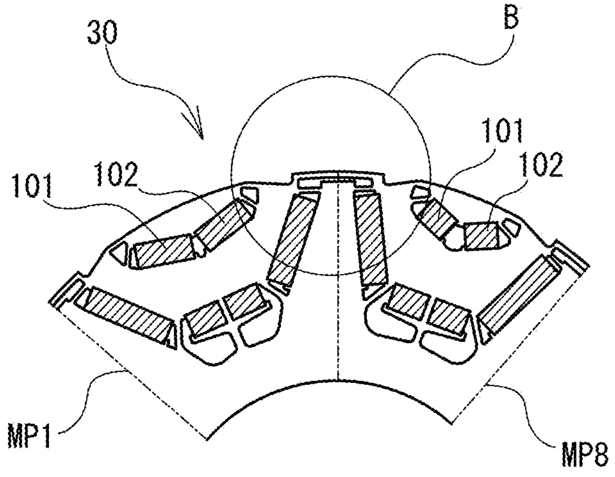
FIG. 13 A is a cross-sectional view schematically illustrating an example of a first protrusion portion between adjacent magnetic poles that are desymmetrized.
FIG. 13B is an enlarged view of the portion enclosed within a circular frame B in FIG. 13A.
Figure 13B:
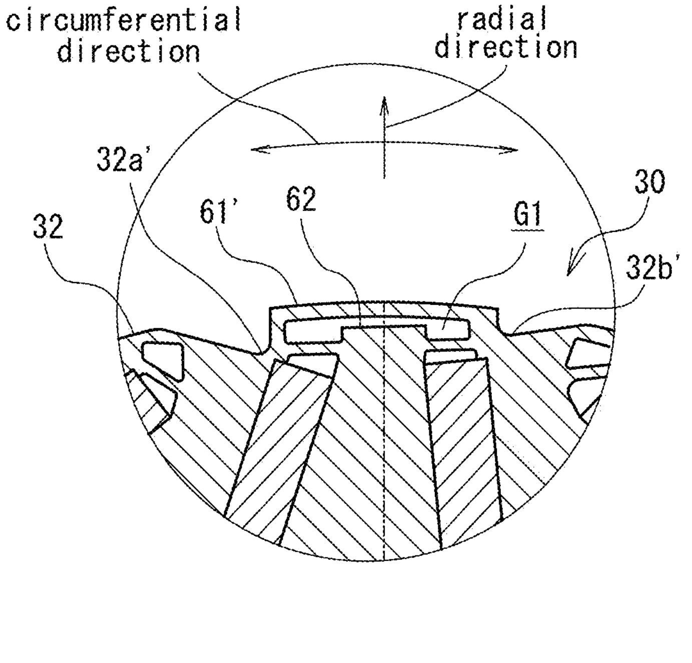

FIG. 13A is a cross-sectional view schematically showing an example of a first protrusion portion 61' between adjacent desymmetrized magnetic poles MP1 and MP8. FIG. 13B is an enlarged view of the portion enclosed within a circular frame B in FIG. 13A.

As shown in FIG. 13A and FIG. 13B, if the recess 32*a'* at the circumferential end of the first protrusion portion 61' is deep, the magnetic flux will not pass easily as if a large gap exists. On the other hand, if the recess 32*b'* at the circumferential end of the first protrusion portion 61' is shallow, the magnetic flux will pass easily as if a small gap exists. Therefore, by setting the deep end (recess 32*a'*) of the first protrusion portion 61' to the magnetic pole MP1 side, which is composed of the relatively large permanent magnets 101 and 102 and has a large amount of magnetic flux, and setting the shallow end (recess 32*b'*) of the first protrusion portion 61' to the magnetic pole MP8 side, which is composed of the relatively small permanent magnets 101 and 102 and has a small amount of magnetic flux, the variation in the amount of fundamental wave components of the magnetic flux due to the desymmetrization between the adjacent magnetic poles MP1 and MP8 can be reduced. Furthermore, by changing the depth of the recesses 32*a*, 32*b* at both circumferential ends of the first protrusion portion 61, the zero cross point is shifted closer to the q axis, thereby further reducing the variation in the amount of fundamental wave components of the magnetic flux.

<Effect of the Configurations (1) and (2)>

As described above, in the rotor structure according to this embodiment, the first gap G1, the protrusion portions 61, 62, and the asymmetric structure between the magnetic poles are adopted to suppress harmonic components, and the effects of these will be explained below based on the results of simulation tests and experiments.

Figure 14A:
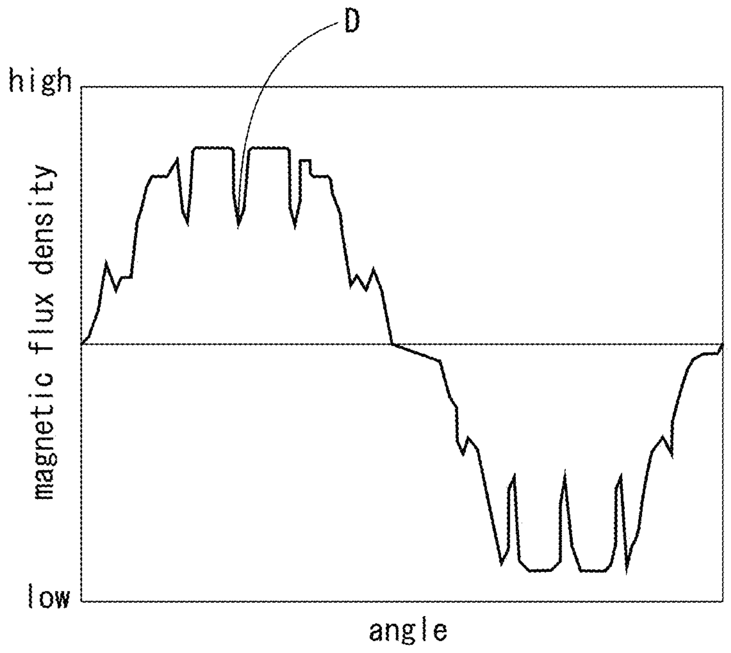
FIG. 14A is a spatial distribution view of magnetic flux density.
Figure 14B:
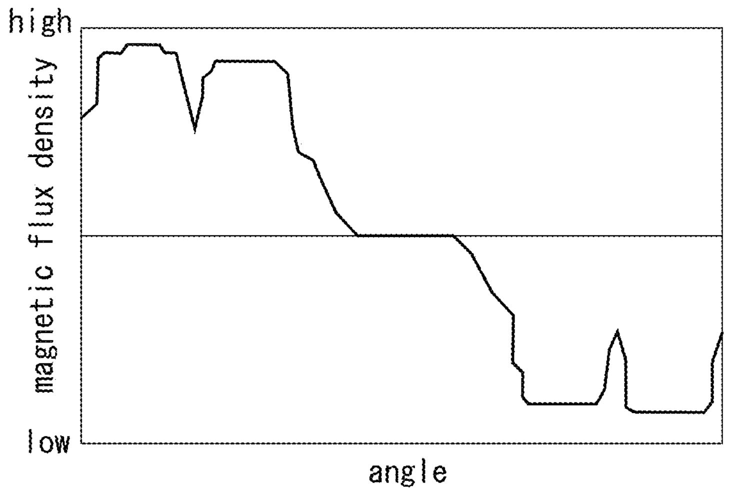
FIG. 14B is a spatial distribution view of magnetic flux density.
Figure 15A:
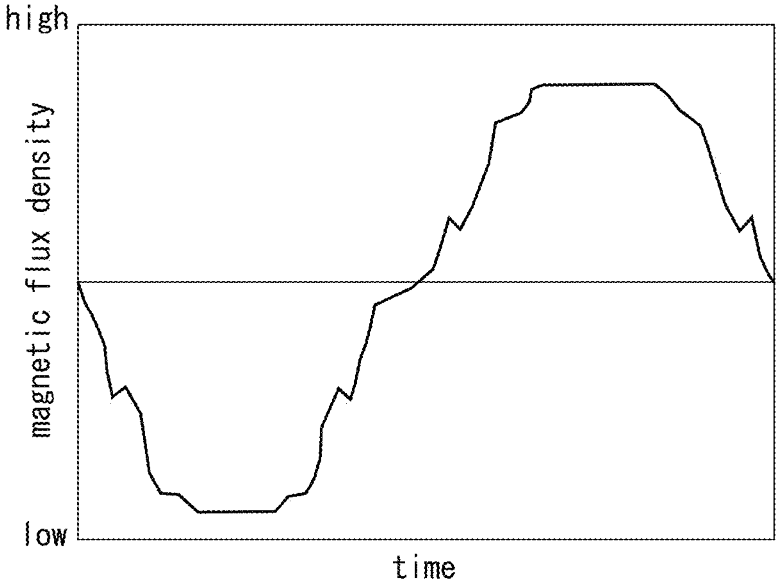
FIG. 15A is a time distribution view of magnetic flux density.
Figure 15B:
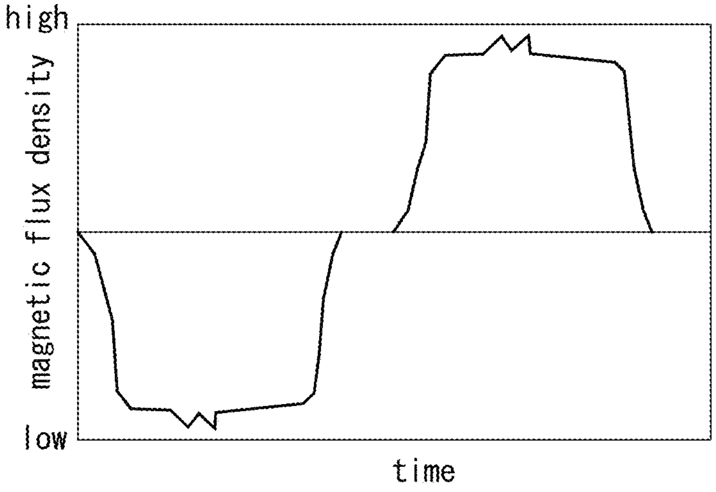
FIG. 15B is a time distribution view of magnetic flux density.

FIG. 14A and FIG. 14B are spatial distribution views of the magnetic flux density, and FIG. 15A and FIG. 15B are time distribution views of the magnetic flux density. More specifically, FIG. 14A and FIG. 14B show the spatial distribution of the magnetic flux density in an air gap G between the stator 90 and the rotor 10, with the magnetic flux density on the vertical axis and the angle on the outer circumference of the rotor core 30 on the horizontal axis. FIG. 15A and FIG. 15B show the change in the magnetic flux density over time in an air gap G between the stator 90 and the rotor 10, with the magnetic flux density on the vertical axis and time on the horizontal axis. Thus, FIG. 14A and FIG. 15A both relate to the synchronous motor 1 according to this embodiment, and FIG. 14B and FIG. 15B both relate to a conventional synchronous motor (not shown) that does not employ the first gap G1, the protrusion portions 61 and 62, or the asymmetric structure.

As is clear from a comparison between FIG. 14A and FIG. 14B, it is understood that in the synchronous motor 1 according to this embodiment, the generation of harmonic components is suppressed, and therefore a composite wave as in the conventional synchronous motor is not obtained, and the magnetic flux density is distributed in a sinusoidal shape in an air gap G between the stator 90 and the rotor 10. The symbol D shown in FIG. 14A indicates a sudden drop in the magnetic flux density that inevitably occurs at the slot position (between the teeth 95 and the teeth 95) of the stator 90 where no magnetic flux is emitted, and does not negate the sinusoidal distribution. Moreover, as is clear from a comparison between FIG. 15A and FIG. 15B, it is understood that in the synchronous motor 1 according to this embodiment, the magnetic flux density changes sinusoidally also over time in an air gap G between the stator 90 and the rotor 10.

Figure 16B:
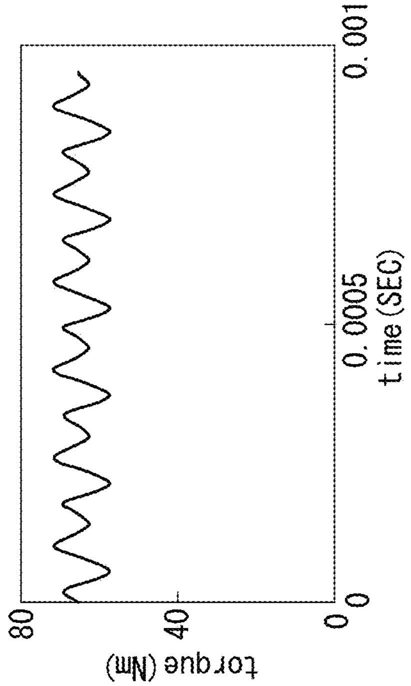
FIG. 16B is a view schematically showing torque change over time in a high rotation range.
Figure 16A:
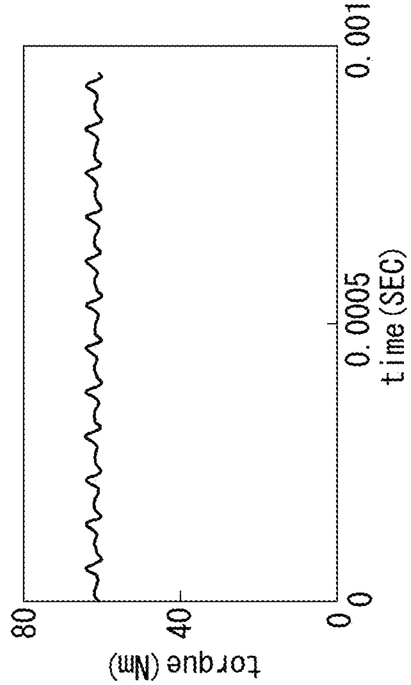
FIG. 16A is a view schematically showing torque change over time in a high rotation range.

FIG. 16A and FIG. 16B are views schematically showing the change in torque over time in the high rotation range, respectively. FIG. 16A relates to the synchronous motor 1 according to the present embodiment, and FIG. 16B relates to a conventional synchronous motor that does not employ the first gap G1, the protrusion portions 61, 62, or the asymmetric structure. Note that the high rotation range here refers to the range in which the motor rotation speed is 14,000 to 16,000 (rpm).

As described above, if the magnetic resistance changes significantly with the rotation of the rotor 10, the harmonic components will be amplified, which should lead to torque ripple occurring more easily in the high rotation range. However, as is clear from a comparison of FIG. 16A and FIG. 16B, the synchronous motor 1 according to this embodiment not only suppresses the generation of harmonic components, but also, by adopting an asymmetric structure between adjacent magnetic poles, it is possible to significantly reduce the generation of periodic fluctuations in torque, i.e., torque ripple, compared to conventional synchronous motors, even in the high rotation range where torque ripple should easily occur.

Figure 17A:
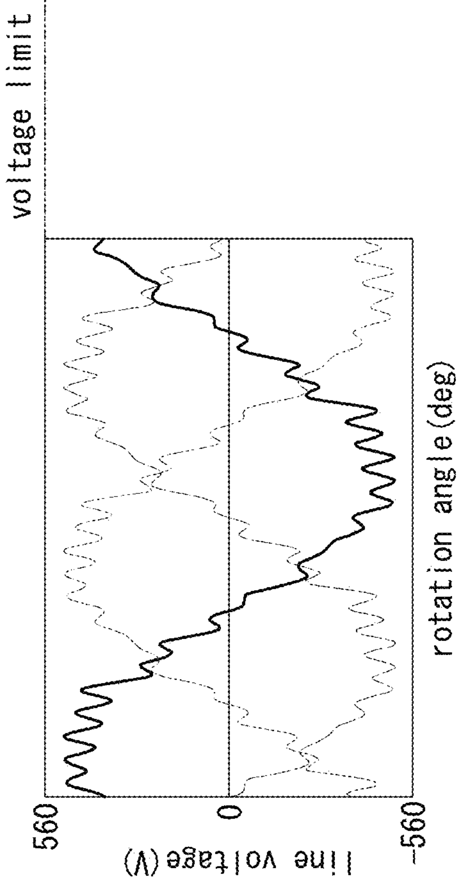
FIG. 17A is a view schematically showing a change in the line voltage of a three-phase alternate current applied to a motor with respect to the rotation angle.
Figure 17B:
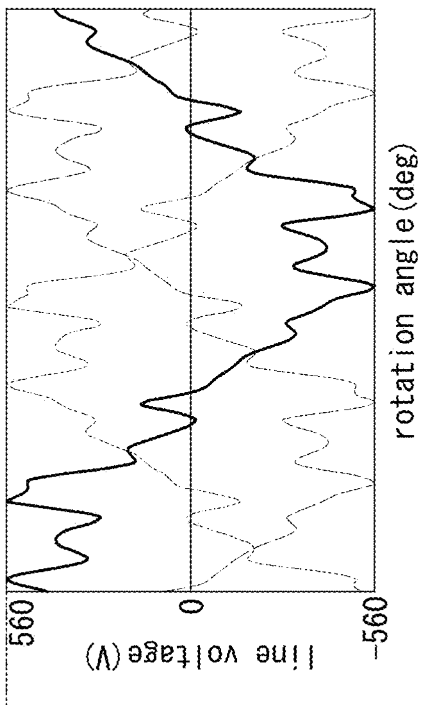
FIG. 17B is a view schematically showing a change in the line voltage of a three-phase alternate current applied to a motor with respect to the rotation angle.

FIG. 17A and FIG. 17B are views schematically showing the change in the line voltage of the three-phase alternate current applied to the motor with respect to the rotation angle, respectively. FIG. 17A shows the line voltage at the maximum rotation operating point in the synchronous motor 1 according to this embodiment, and FIG. 17B shows the line voltage at the maximum rotation operating point in a conventional synchronous motor that does not employ the first gap G1, the protrusion portions 61, 62, or the asymmetric structure. The voltage ripple of the back electromotive voltage, which is the voltage generated by the motor against the voltage applied to the rotating motor, originates from the harmonic components of the magnetic flux, just like the torque ripple, and in the synchronous motor 1 according to this embodiment, the voltage ripple is also reduced as a secondary effect of reducing the torque ripple.

Specifically, unlike a conventional synchronous motor in which the line voltage of the three-phase alternate current disrupted to reach the voltage limit depending on the rotation angle as shown in FIG. 17B, in the synchronous motor 1 of this embodiment, the waveform of the line voltage of the three-phase alternate current approaches an ideal sine wave within the range of the voltage limit as shown in FIG. 17A. In this way, since the line voltage waveform of the three-phase alternate current at the maximum rotation operating point can be made to approach a sine wave, it is possible to improve the controllability of the synchronous motor 1 at high rotation speeds.

(3) Center Bridgeless Structure

Figure 18A:
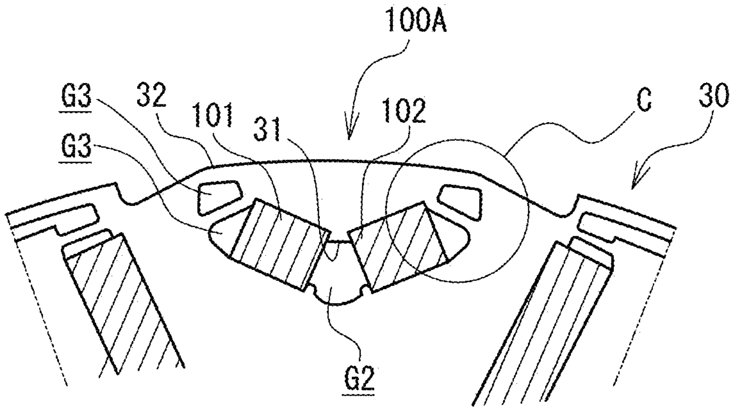
FIG. 18A shows the outer embedded magnet section of the rotor core according to this embodiment for schematically explaining the center bridgeless structure.
Figure 18B:
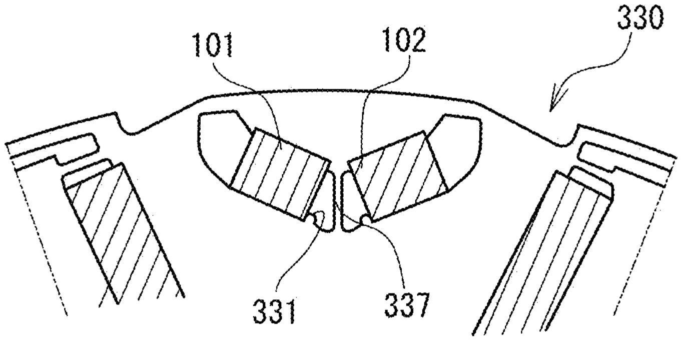
FIG. 18B shows a portion of the conventional rotor core corresponding to FIG. 18A.
Figure 18C:
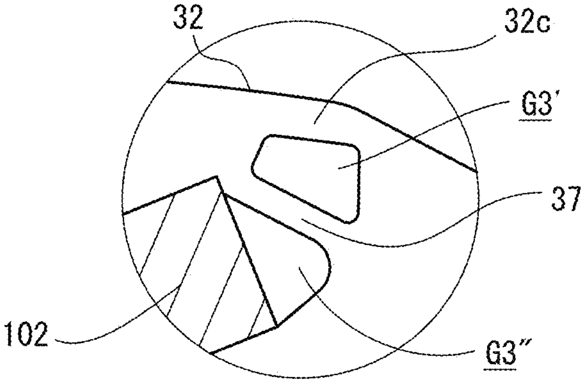
FIG. 18C shows an enlarged view of the portion surrounded by the circular frame C in FIG. 18A.

FIG. 18A shows the outer embedded magnet section 100A of the rotor core 30 according to this embodiment for schematically explaining the center bridgeless structure. FIG. 18B shows a portion of the conventional rotor core 330 corresponding to FIG. 18A. FIG. 18C shows an enlarged view of the portion surrounded by the circular frame C in FIG. 18A. In the rotor structure of this embodiment, the outer embedded magnet section 100A has one magnet hole 31 formed in a V-shape as described above, and the two permanent magnets 10 1 and 102 are inserted into the magnet hole 31 so as to form a V-shape. The portion of such a V-shaped magnet hole 31 that is not filled with the two permanent magnets 10 1 and 102 remains as a gap.

In contrast, in order to ensure mechanical strength in the conventional rotor core 330, a so-called center bridge 337 is provided in the portion of the magnet hole 331 between the two permanent magnets 101, 102 that is not filled with the two permanent magnets 101, 102, as shown in FIG. 18B. However, since such a center bridge 337 becomes a leakage flux path, it becomes easy for short circuit flux to occur between the two permanent magnets 101, 102.

Therefore, in the rotor structure according to the present embodiment, the space between the two adjacent permanent magnets 101, 102 is left as a second gap G2, as shown in FIG. 18A. In this way, since a space between the two adjacent permanent magnets 101, 102 is the second gap G2, in other words, since there is no center bridge 337 between the two permanent magnets 101, 102, which serves as a leakage flux path, the short circuit flux (leakage flux) that does not contribute to torque and occurs between the two permanent magnets 101, 102 can be suppressed, and the magnet flux can be effectively utilized. As a result, even if the stator coil current is low, it is possible to obtain a high torque, thus, the efficiency of the synchronous motor 1 can be further reliably improved.

However, since the center bridge 337 that was conventionally provided between two adjacent permanent magnets 101, 102 was intended to ensure mechanical strength, if a space between the two adjacent permanent magnets 101, 102 is used as a second gap G2 (making bridgeless), the stress acting on other areas in the vicinity of these permanent magnets 101, 102 (stress due to centrifugal force and shrink fitting) will increase relatively.

Therefore, in the rotor structure of this embodiment, the radially outer end of the V-shaped magnet hole 31 is brought close to the outer peripheral surface 32 of the rotor core 30, and the third gap G3 at that end that is not filled with the permanent magnets 101, 102 is divided by the bridge portion 37 into a third gap G3' and a third gap G3", as shown in FIG. 18C. As a result, the third gap G3' is defined by a part of the hole wall of the magnet hole 31, the surface portion (bridge portion 32*c*) of the rotor core 30, and the bridge portion 37. In addition, the third gap G3" is defined by a part of the hole wall of the magnet hole 31, the radially outer end faces of the permanent magnets 101, 102, and the bridge portion 37.

In this way, the third gap G3 at the radially outer end of the V-shaped magnet hole 31 that is not filled with permanent magnets 101, 102 is provided with double bridge portions 37, 32*c*, namely, bridge portion 32*c* formed on the surface of the rotor core 30 and bridge portion 37 that divides the third gap G3, so that stress concentration due to centrifugal force and shrink fitting can be suppressed, thereby preventing deformation of the rotor core 30.

Figure 19C:
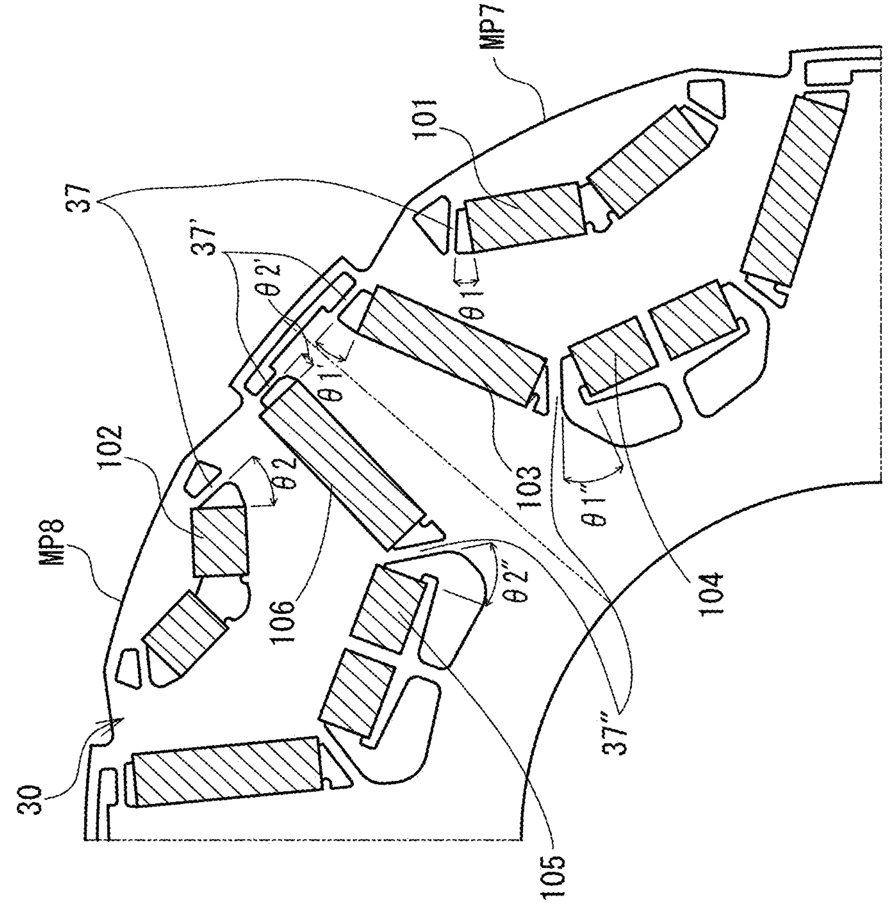
FIG. 19C is a view schematically illustrating the relationship between bridge portions and permanent magnets in the rotor core.
Figure 19A:
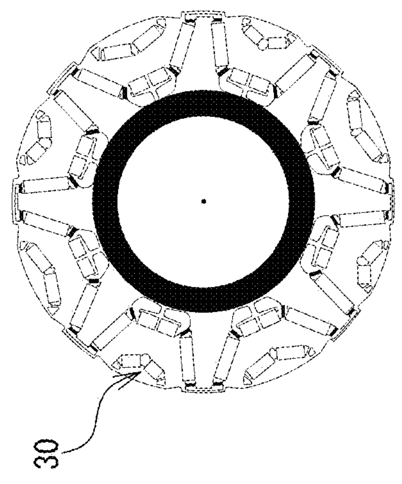
FIG. 19A shows the stress state of rotor core during shrink fitting.
Figure 19B:
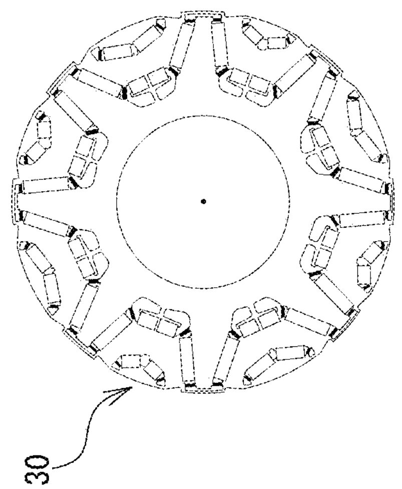
FIG. 19B shows the stress state of rotor core at maximum rotation.

FIG. 19A shows the stress state of rotor core 30 during shrink fitting. FIG. 19B shows the stress state of rotor core 30 at maximum rotation. Also, FIG. 19C is a view schematically illustrating the relationship between bridge portions 37, 37', 37" and permanent magnets 101, 102, - - - in the rotor core 30. As described above, in the rotor structure of this embodiment, adjacent magnetic poles MP1, MP2, - - - are desymmetrized, so that stress concentration is more likely to occur than in conventional rotor structures that are not asymmetrical.

For example, when the rotor shaft 20 is fixed to the central hole 38 of the rotor core 30 by shrink fitting, stress tends to concentrate on the black portion of the rotor core 30 shown in FIG. 19A. Furthermore, when the rotor core 30 is rotated at maximum speed, when a relatively large centrifugal force acts on the rotor core 30, stress tends to concentrate on the black portion of the rotor core 30 shown in FIG. 19B.

Therefore, in the rotor structure of this embodiment, when at least one of the position, shape, size, and inclination of the V-shaped permanent magnets 101, 102 is set to be asymmetric between adjacent magnetic poles in the circumferential direction (for example, magnetic poles MP7 and MP8) when viewed in the axial direction, the relative angles θ1, 02 between the permanent magnets 101, 102 and the bridge portion 37 are also set to be asymmetric between magnetic poles MP7 and MP8, as shown in FIG. 19C.

If the position, etc. of the two V-shaped permanent magnets 101, 102 are asymmetric between magnetic poles MP7, MP8, stress concentration is likely to occur near these permanent magnets 101, 102, however, with this configuration, the relative angle θ1 between the permanent magnet 101 and the bridge portion 37 at magnetic pole MP7 and the relative angle θ2 between the permanent magnet 102 and the bridge portion 37 at magnetic pole MP8 are set to be asymmetric, therefore, depending on the setting of the relative angles θ1, θ2, stress concentration due to desymmetrization can be suppressed, thereby preventing deformation of the rotor core 30 during shrink fitting or maximum rotation.

Similarly, when the positions, etc. of the two permanent magnets 103, 106 are asymmetric between the magnetic poles MP7, MP8, the relative angle θ1' between the permanent magnet 103 in the magnetic pole MP7 and the bridge portion 37' and the relative angle θ2' between the permanent magnet 106 in the magnetic pole MP8 and the bridge portion 37' may be set to be asymmetric, as shown in FIG. 19C. Also, when the positions, etc. of the two permanent magnets 104, 105 are asymmetric between the magnetic poles MP7, MP8, the relative angle θ1" between the permanent magnet 104 in the magnetic pole MP7 and the bridge portion 37" and the relative angle θ2" between the permanent magnet 105 in the magnetic pole MP8 and the bridge portion 37" may be set to be asymmetric.

<(4) Squeezing Section>

Figure 20:
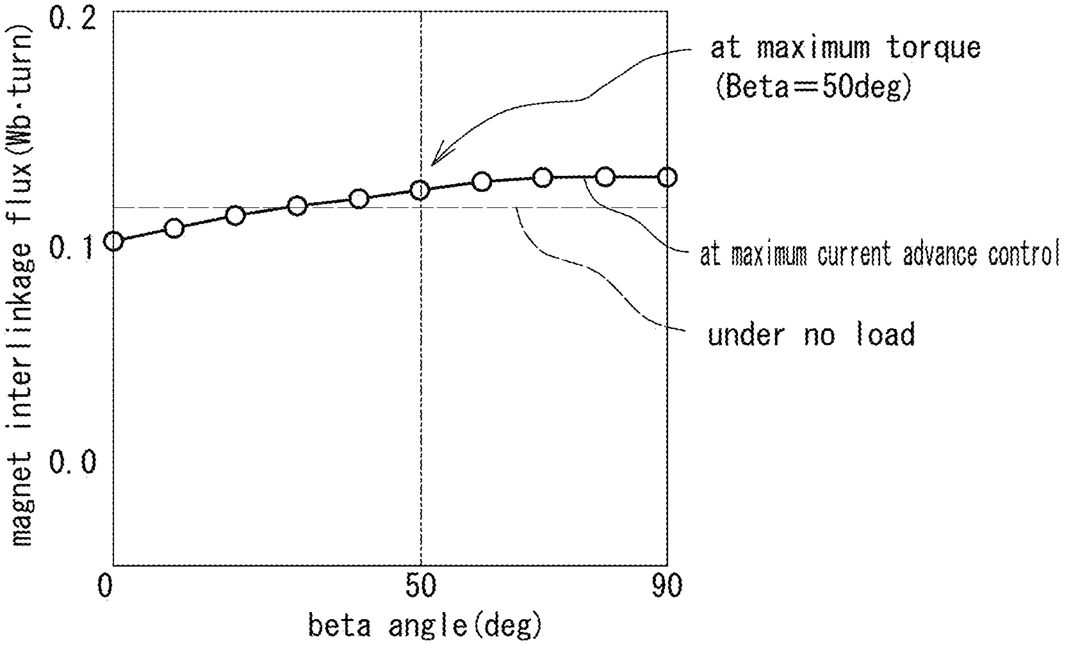
FIG. 20 is a graph showing magnetic interlinkage flux.

FIG. 20 is a graph showing the magnetic interlinkage flux. In this embodiment, the aim is to increase the efficiency of the synchronous motor 1, and since the "efficiency" of a motor is "output/(output+loss)" as described above, in order to increase the efficiency of the motor, it is necessary to increase the output while suppressing loss (iron loss).

For example, since the magnetic flux of the permanent magnet does not contribute to torque generation when there is no load, it is preferable to suppress the magnetic flux when there is no load from the viewpoint of reducing iron loss. On the other hand, in general, when a synchronous motor having reverse saliency (d-axis reactance is smaller than q-axis reactance) is under heavy load, in order to utilize reluctance torque, control (advance control) is often performed to advance the current phase to about 50 (deg) at the maximum current in order to make the motor exert maximum torque, however, in such advance control, the magnetic flux of the permanent magnet is suppressed by the magnetic flux component generated by the stator coil current that opposes the magnetic flux of the permanent magnet, and the magnetic flux of the entire motor may be weakened. For these reasons, in order to improve the efficiency of the motor, it is preferable to suppress the magnetic flux when there is a light load (e.g., when there is no load) and ensure the magnetic flux when there is a heavy load (e.g., when there is maximum torque).

In this regard, in the rotor structure of this embodiment, by devising a shape of the rotor core 30, a state is realized in which the magnetic interlinkage flux at maximum torque is greater than the magnetic interlinkage flux at no load (magnetic interlinkage flux at zero current amplitude), as shown in FIG. 20. The "squeezing section" that makes it possible to realize such a state will be described in detail below.

Figure 21A:
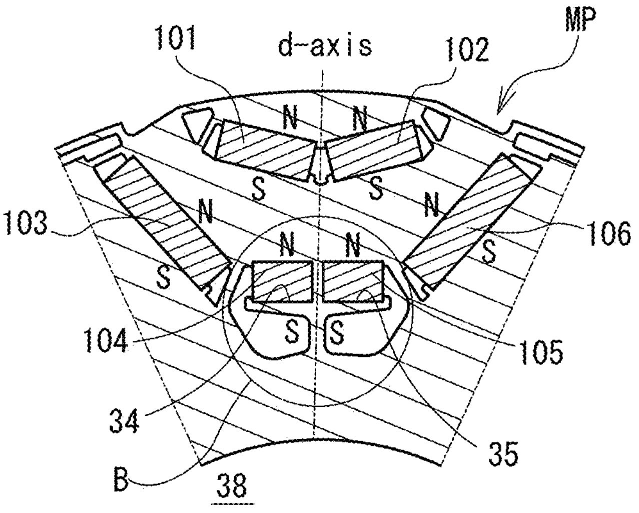
FIG. 21A is a view schematically showing the squeezing section in a portion corresponding to one magnetic pole in the rotor core.
Figure 21B:
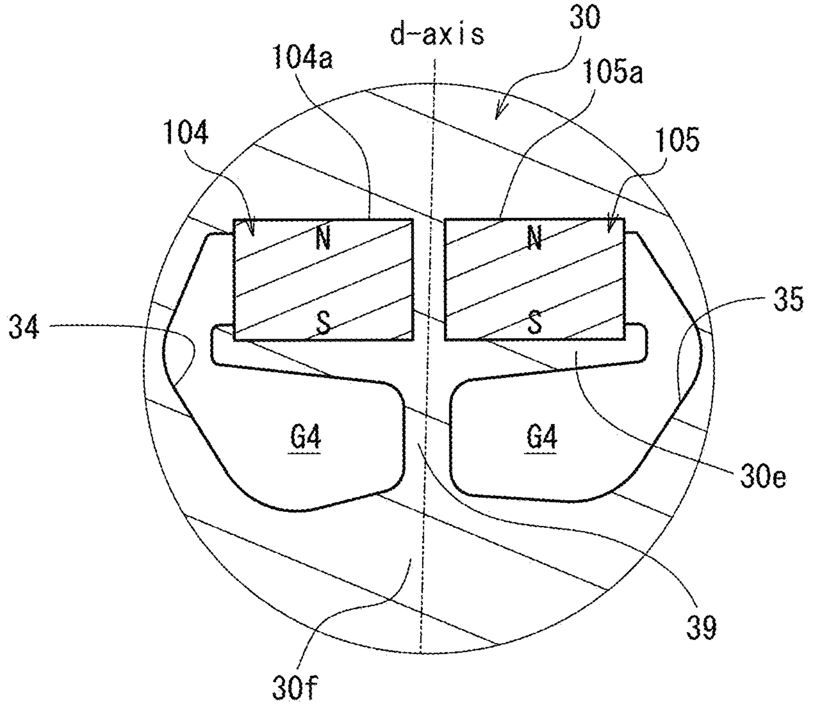
FIG. 21B shows an enlarged view of the portion surrounded by a circular frame B in FIG. 21A.

FIG. 21A is a view schematically showing the squeezing section 39 in a portion corresponding to one magnetic pole MP in the rotor core 30. FIG. 21B shows an enlarged view of the portion surrounded by a circular frame B in FIG. 21A. As described above, each magnetic pole MP includes a V-shaped magnet hole (outer magnet hole) 31 formed on the outermost periphery of the rotor core 30 and extending in the circumferential direction, and magnet holes (inner magnet holes) 34, 35 formed radially inward of the magnet hole 31 and extending in the circumferential direction, as shown in FIG. 21A.

As shown in FIG. 21B, the magnet holes 34, 35 are formed in a shape such that the radially outer surfaces 104*a*, 105*a* of the permanent magnets (inner permanent magnets) 104, 105 inserted into these magnet holes 34, 35 contact the rotor core 30 and a relatively large fourth gap G4 is provided in the radially inner portion not filled with the permanent magnets 104, 105 (more precisely, the portion radially inner than the fixing portion 30*e* for fixing the permanent magnets 104, 105).

Thus, in the rotor core 30, a long and narrow squeezing section 39 is formed which circumferentially divides the fourth gap G4 and extends radially through the d-axis of each magnetic pole MP so as to connect a portion 30*f* of the rotor core 30 which is radially inward from the permanent magnets 104, 105 when viewed in the axial direction to the permanent magnets 104, 105 (more precisely, the fixing portion 30*e*).

Figure 22A:
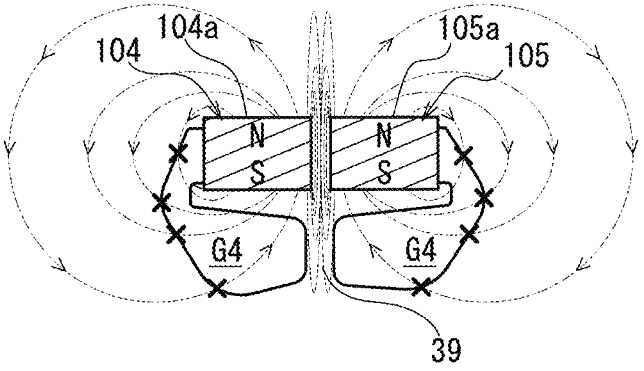
FIG. 22A is a view schematically explaining a function of a squeezing section under light load.
Figure 22B:
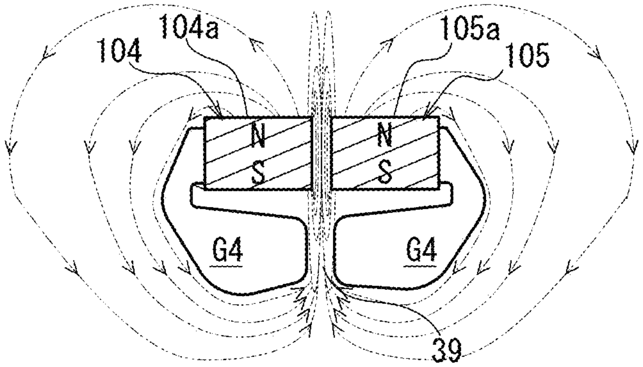
FIG. 22B is a view schematically explaining a function of a squeezing section under light load.
Figure 22C:
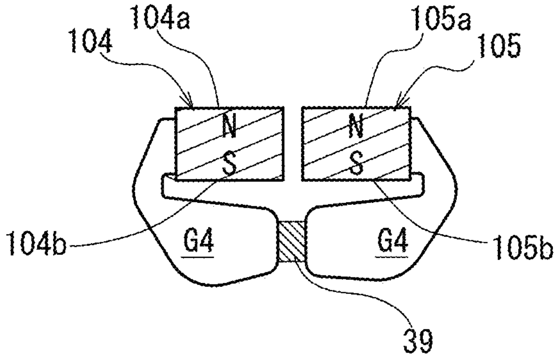
FIG. 22C is a view schematically explaining a function of a squeezing section under light load.

FIG. 22A, FIG. 22B and FIG. 22C are views schematically explaining the function of the squeezing section 39 under light load, respectively. Since the rotor core 30 is formed in a shape having a relatively large fourth gap G4 radially inward from the permanent magnets 104, 105, the magnetic flux from the radially outer surfaces 104*a*, 105*a* of the permanent magnets 104, 105 that contact the rotor core 30, which is a magnetic body, has difficulty in passing through the fourth gap G4, as shown by the x mark in FIG. 22A. Therefore, as shown in FIG. 22B, the magnetic flux is concentrated at the squeezing section 39 that divides the fourth gap G4 so as to connect the rotor core 30 and the permanent magnets 104, 105.

However, because the squeezing section 39 is formed long and thin, for example, when the load is light, as shown by the hatching in FIG. 22C, magnetic saturation occurs immediately, and the magnetic permeability becomes very small and reaches a value close to that of a vacuum (gap), so that the radially inner surfaces 104*b*, 105*b* of the permanent magnets 104, 105 are ultimately in a state similar to being entirely covered by the fourth gap G4. In this way, when the load is light (for example, when there is no load), the magnetic flux (magnetic interlinkage flux) at maximum torque (Beta=50 (deg)) can be suppressed due to the magnetic saturation of the squeezing section 39, as shown by the dashed line in FIG. 20.

Figure 23A:
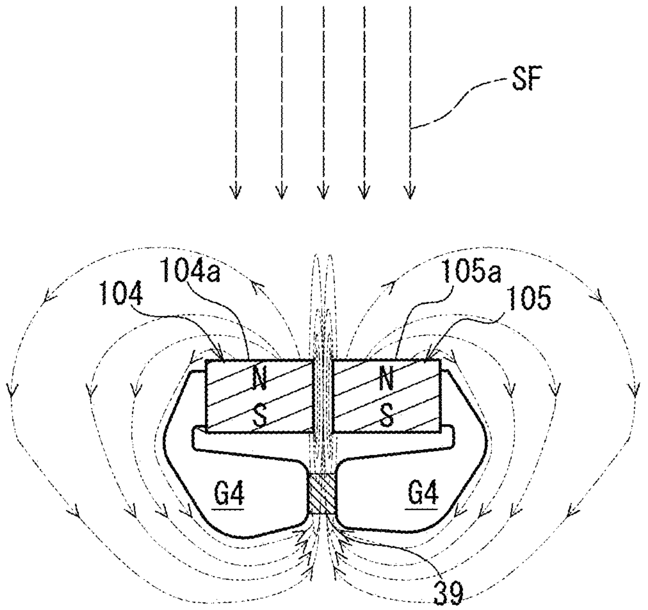
FIG. 23A is a view schematically explaining a function of a squeezing section under heavy load.
Figure 23B:
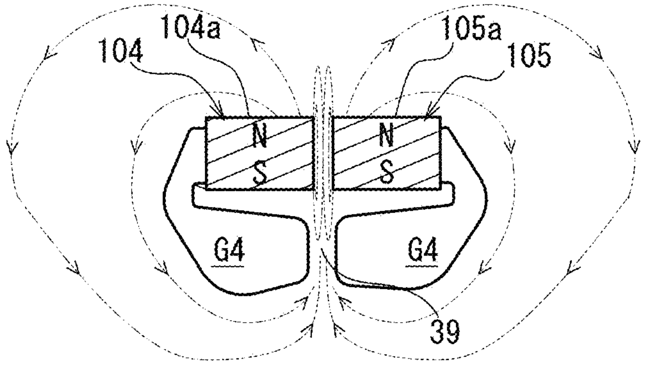
FIG. 23B is a view schematically explaining a function of a squeezing section under heavy load.

FIG. 23A and FIG. 23B are views schematically explaining the function of the squeezing section 39 under heavy load, respectively. As described above, since the current advance control is approximately equal to the field weakening control, the magnetic flux of the permanent magnets 104, 105 generated by the current advance control is suppressed by the magnetic flux component SF generated from the stator coil 93 and opposing the magnetic flux of the permanent magnets 104, 105, as shown in FIG. 23A.

As a result, the magnetic flux component SF controls the flow of the congested magnetic flux in the squeezing section 39, and the magnetic saturation in the squeezing section 39 is eliminated as shown in FIG. 23B, so that the magnetic flux of the permanent magnets 104, 105 that was restricted by the magnetic saturation can be effectively utilized for torque generation. In other words, even if the magnetic flux of the entire motor is weakened by the stator coil current due to the advance control at the time of heavy load (for example, at the time of maximum torque), the magnetic flux (magnetic interlinkage flux) at the time of maximum torque (Beta=50 (deg)) can be secured by eliminating the magnetic saturation in the squeezing section 39 as described above, as shown in FIG. 20.

<Effects of the Configurations (1), (2), and (4)>

Figures 24A, 24B, 24C:
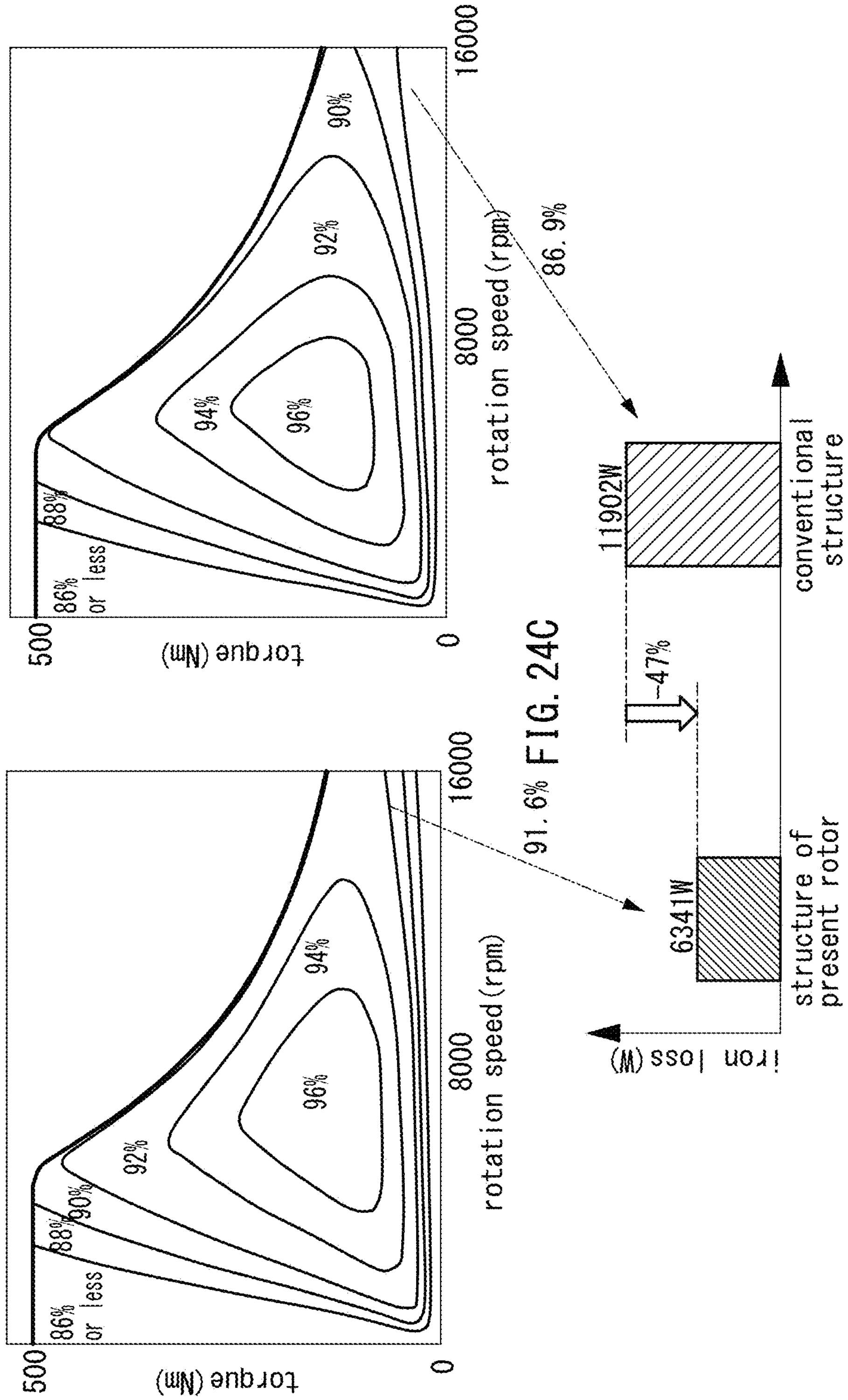
FIG. 24A is a view showing efficiency characteristics for a synchronous motor of an embodiment of the present invention.
FIG. 24B is a view showing efficiency characteristics for a conventional synchronous motor.
FIG. 24C is an iron loss comparison view for the embodiment of the present invention and the conventional rotor structure.

FIG. 24A, FIG. 24B and FIG. 24C are efficiency characteristic views and an iron loss comparison view for the rotor structure of this embodiment and the conventional rotor structure. More specifically, FIG. 24A is an efficiency characteristic view for the synchronous motor 1 of this embodiment, FIG. 24B is an efficiency characteristic view for a conventional synchronous motor that does not employ the first gap G1, the protrusion portions 61 and 62, the asymmetric structure, and the squeezing section 39, and FIG. 24C is an iron loss comparison view for both rotor structures.

In the synchronous motor 1 of this embodiment, the harmonic components of the magnetic flux are suppressed, and the magnetic flux is suppressed under light load (e.g., no load), while under heavy load (maximum torque), high torque can be obtained even with advance control, so that the motor efficiency at the maximum rotation operating point can be increased to 91.6% as shown in FIG. 24A. On the other hand, in a conventional synchronous motor, even when the same control was performed, the motor efficiency at the maximum rotation operating point was only 86.9% as shown in FIG. 24B. When these are converted into iron loss, it was confirmed that the iron loss (loss) of the synchronous motor 1 of this embodiment can be reduced by 47% as compared to the conventional synchronous motor, as shown in FIG. 24C.

As described above, in the synchronous motor 1 of this embodiment, not only the first gap G1, the protrusion portions 61, 62, and the asymmetric structure are adopted, but a simple configuration of forming the squeezing section 39 is added, thereby making it possible to more reliably achieve high efficiency in the synchronous motor 1 both under light load and under heavy load.

<(5) Oil Passage>

Figure 25:
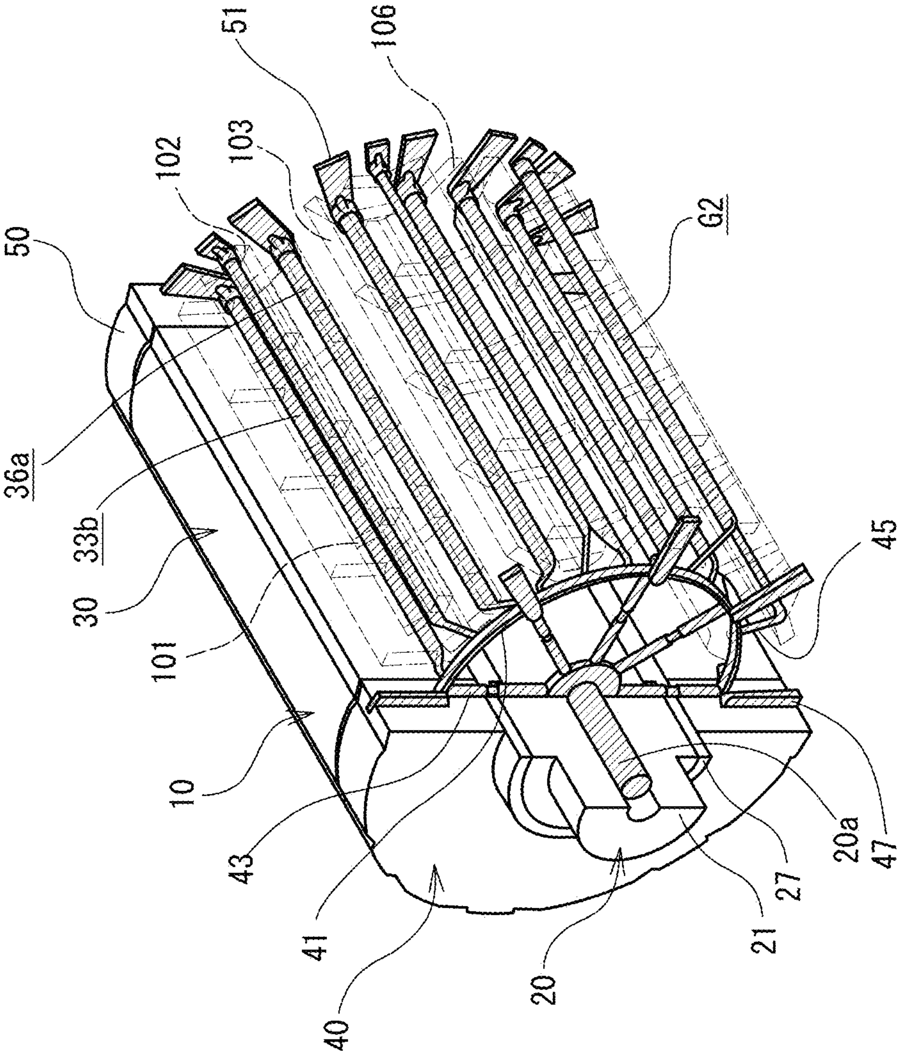
FIG. 25 is a view schematically showing an oil passage in a rotor.
Figure 26B:
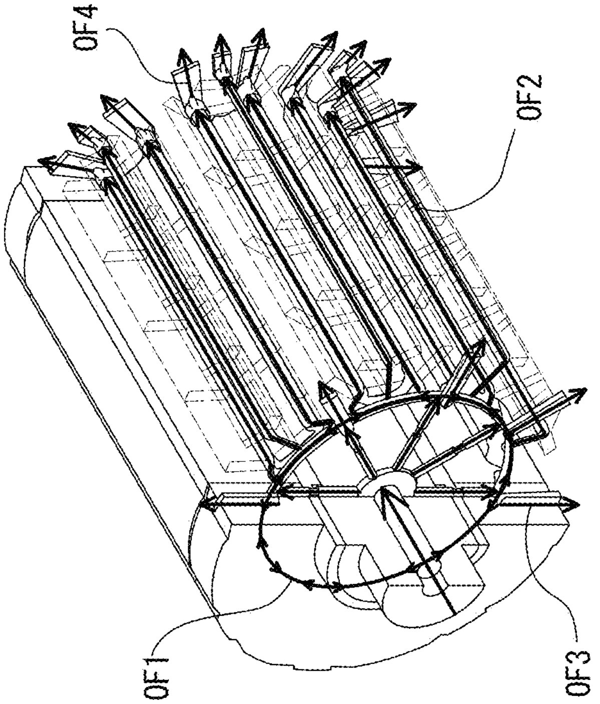
FIG. 26B is a perspective view schematically showing the oil flow in the rotor.
Figure 26A:
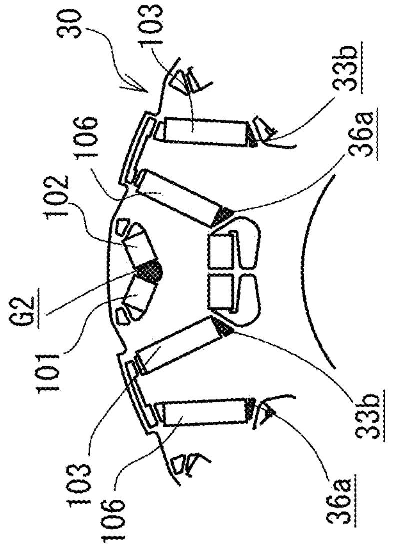
FIG. 26A is a cross-sectional view schematically showing an oil flow in a rotor.

FIG. 25 is a view schematically showing oil paths in the rotor 10. FIG. 26A and FIG. 26B are a cross-sectional view and a perspective view schematically showing oil flow in the rotor 10, respectively. As described above, in the synchronous motor 1 of this embodiment, the increase in iron loss is suppressed, so that the amount of heat generated inside the motor can be reduced even when the synchronous motor 1 is made smaller, however, when the current density is increased, the amount of heat generated by the permanent magnets 101, 102, 103, and 106 close to the stator 90 may increase to a degree that exceeds the reduction in the amount of heat generated by suppressing the increase in iron loss.

Therefore, in the rotor structure of this embodiment, the magnet holes 31, 33, and 36 are used as oil paths for flowing a cooling oil. The configuration that enables such oil paths will be described below.

Inside the first end plate 40, there are formed an annular chamber space 41 concentric with the axis center AC, a connecting flow passage 43 connecting the oil introduction passage 20*a* of the rotor shaft 20 to the chamber space 41, and a radial oil passage 45 which communicates with the chamber space 41 at its radially inner end and extends radially outward, as shown in FIG. 25. The radially outer end of the radial oil passage 45 communicates with the second gap G2, a portion (gap) 33*b* of the magnet hole 33 that is not filled with the permanent magnet 103, and a portion (gap) 36*a* of the magnet hole 36 that is not filled with the permanent magnet 106.

By forming such a chamber space 41 and connecting passage 43 inside the first end plate 40, a cooling oil discharged from the oil introduction passage 20*a* of the rotor shaft 20 is filled into the chamber space 41, as shown by the symbol OF1 in FIG. 26B. Furthermore, by forming the radial oil passage 45 inside the first end plate 40, the cooling oil filled in the chamber space 41 is distributed to the second gap G2 and the gaps 33*b*, 36*a* through the radial oil passage 45, and as shown by the symbol OF2 in FIG. 26B, the cooling oil passes through the second gap G2 and the gaps 33*b*, 36*a* (see the blackened parts in FIG. 26A) and flows inside the rotor core 30 from the anti-output axis side AOS to the output axis side OS. In this way, the cooling oil once filled in the chamber space 41 is sent to the second gap G2 and the gaps 33*b*, 36*a*, so that the oil can be evenly distributed to the second gap G2 and the gaps 33*b*, 36*a*.

As described above, by using the magnet holes 31, 33, 36 as oil paths for flowing a cooling oil, it is possible to directly cool the permanent magnets 101, 102, 103, 106 inserted into the magnet holes 31, 33, 36, as shown in FIG. 26A. In this way, by directly cooling the permanent magnets 101, 102, 103, 106 with a cooling oil, combined with the reduction in the amount of heat generated inside the motor due to the high efficiency of the synchronous motor 1, it is possible to more reliably suppress demagnetization of the permanent magnets 101, 102, - - - when the synchronous motor 1 is made smaller, and it is also possible to increase the current density of the current flowing through the stator coil 93.

In addition, inside the first end plate 40, a first diffusion oil passage 47 may be formed, which communicates with the chamber space 41 at the radially inner end, extends radially outward, and opens on the outer circumferential surface of the first end plate 40, as shown in FIG. 25. By forming such a first diffusion oil passage 47, it is possible to scatter a part of the cooling oil filled in the chamber space 41 from the outer circumferential surface of the first end plate 40 to the radially outer side through the first diffusion oil passage 47 by centrifugal force, as shown by the symbol OF3 in FIG. 26B. Thus, since the first end plate 40 is arranged so as to overlap the coil end 93*a* on the anti-output axis side AOS when viewed in the radial direction, it is possible to cool not only the inside of the rotor core 30 but also the coil end 93*a*.

Furthermore, also inside the second end plate 50, a second diffusion oil passage 51 may be formed, which communicates with the second gap G2 and the gaps 33*b*, 36*a* at the radially inner end, extends radially outward, and opens at the outer circumferential surface of the second end plate 50, as shown in FIG. 25. By forming such a second diffusion oil passage 51, it becomes possible to scatter the cooling oil after cooling the permanent magnets 101, 102, - - - from the outer circumferential surface of the second end plate 50 to the radially outer side through the second diffusion oil passage 51 by centrifugal force, as shown by the symbol OF4 in FIG. 26B. Thus, since the second end plate 50 is arranged so as to overlap the coil end 93*b* on the output axis side OS when viewed in the radial direction, it is also possible to cool the coil end 93*b*.

In addition, because the rotor core 30 is a laminated body of stacked magnetic thin plates, it is supposed that an oil flowing in the axial direction inside the rotor core 30 may leak into the gaps between the magnetic thin plates. In this case, it may seem that the leaked oil would have nowhere to escape because it is sandwiched between first end plate 40 and second end plate 50, but by forming discharge recesses 49, 53 in first and second end plates 40, 50 as shown in FIG. 1, it is possible for the oil that has leaked into the gaps between the magnetic thin plates to be discharged to the outside of rotor core 30 through these discharge recesses 49, 53.

Furthermore, the chamber space 41, the connecting flow path 43, the radial oil passage 45, the first diffusion oil passage 47 and the second diffusion oil passage 51 may be formed, for example, using a sand mold for casting, or may be formed by constructing the first and second end plates 40, 50 with a plurality of plates (not shown) divided in the axial direction, providing grooves or the like that form part of the oil passages on the front and back surfaces of each plate, and combining these grooves or the like in the axial direction.

OTHER EMBODIMENTS

The present invention is not limited to the embodiments, and can be embodied in various other forms without departing from the spirit or main characteristics thereof.

In the above embodiment, the rotor structure is a combination of (1) the first gap G1 and the protrusion portions 61, 62, (2) the asymmetric structure, (3) the center bridgeless structure, (4) the squeezing section 39, and (5) the oil passage, however, as long as it includes at least (1) the first gap G1 and the protrusion portions 61, 62, the rotor structure is not limited and may be, for example, a rotor structure having only (1) the first gap G1 and the protrusion portions 61, 62, a rotor structure combining (1) the first gap G1 and the protrusion portions 61, 62 with (2) the asymmetric structure, a rotor structure combining (1) the first gap G1 and the protrusion portions 61, 62 with (4) the squeezing section 39, or a rotor structure combining (1) the first gap G1 and the protrusion portions 61, 62, (2) the asymmetric structure, and (5) the oil passage.

In addition, in the above embodiment, the eight magnetic poles MP1, MP2, - - - are configured in a two-layer structure consisting of an outer embedded magnet section 100A including two permanent magnets 101, 102 arranged in a V shape and an inner embedded magnet section 100B including four permanent magnets 103, 104, 105, 106 arranged in a U shape, but the configuration and number of magnetic poles are not limited to this.

Figure 27A:
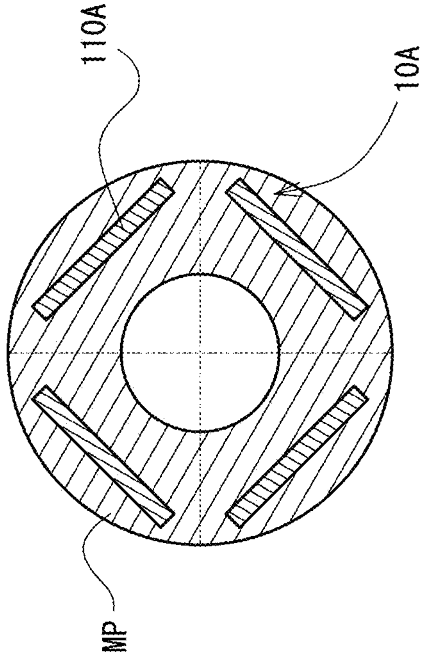
FIG. 27A is a cross-sectional view schematically showing an arrangement pattern of permanent magnets according to another embodiment.
Figure 27B:
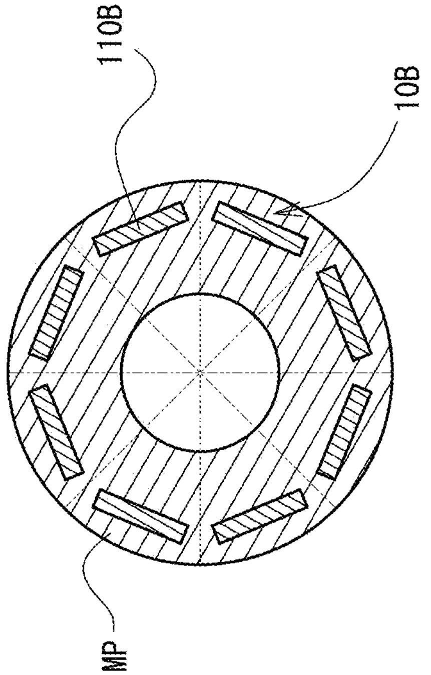
FIG. 27B is a cross-sectional view schematically showing an arrangement pattern of permanent magnets according to another embodiment.
Figure 27C:
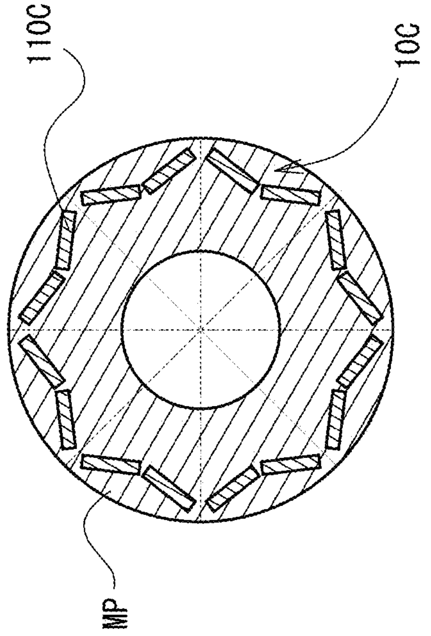
FIG. 27C is a cross-sectional view schematically showing an arrangement pattern of permanent magnets according to another embodiment.
Figure 27D:
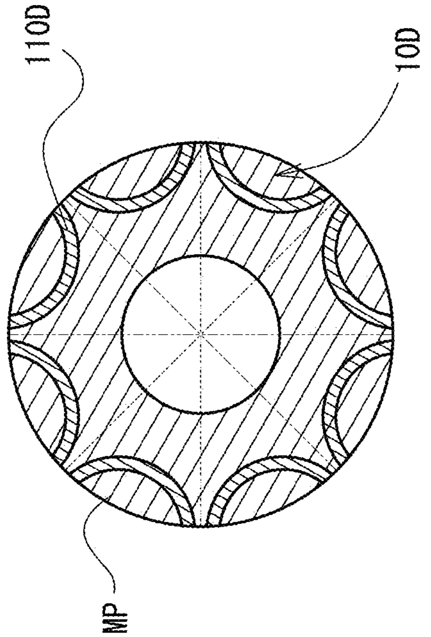
FIG. 27D is a cross-sectional view schematically showing an arrangement pattern of permanent magnets according to another embodiment.

For example, if (3) the center bridgeless structure or (4) the squeezing section 39 is not adopted, then, the rotor may be a four-pole rotor 10A in which each magnetic pole MP has a magnet section 110A having a single-layer structure consisting of a single permanent magnet approximately parallel to the circumferential direction, as shown in FIG. 27A, or an eight-pole rotor 10B in which each magnetic pole MP has a magnet section 110B having a single-layer structure consisting of a single permanent magnet approximately parallel to the circumferential direction, as shown in FIG. 27B, or an eight-pole rotor 10C in which each magnetic pole MP has a magnet section 110C having a single-layer structure consisting of two permanent magnets arranged in a V-shape, as shown in FIG. 27C, or an eight-pole rotor 10D in which each magnetic pole MP has a magnet section 110D having a single-layer structure consisting of a single inverted arc-shaped permanent magnet, as shown in FIG. 27D.

Figure 28A:
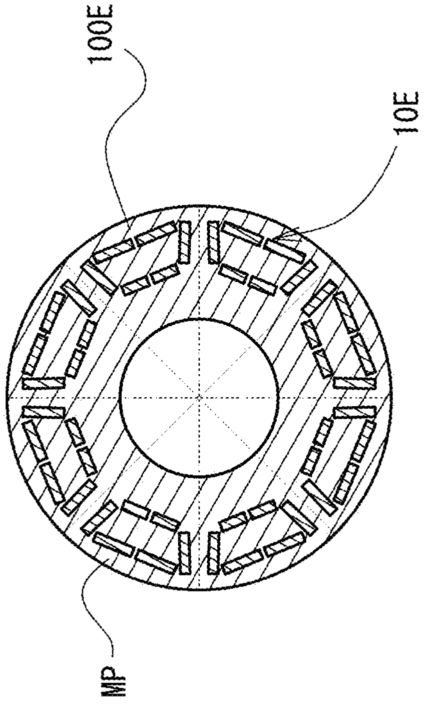
FIG. 28A is a cross-sectional view schematically showing an arrangement pattern of permanent magnets according to another embodiment.
Figure 28B:
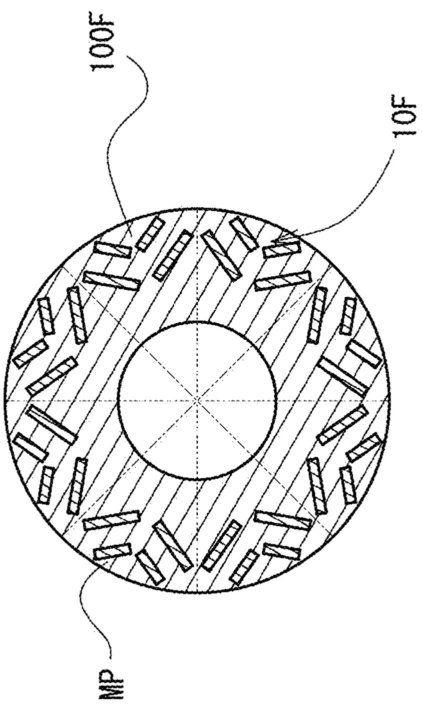
FIG. 28B is a cross-sectional view schematically showing an arrangement pattern of permanent magnets according to another embodiment.
Figure 28C:
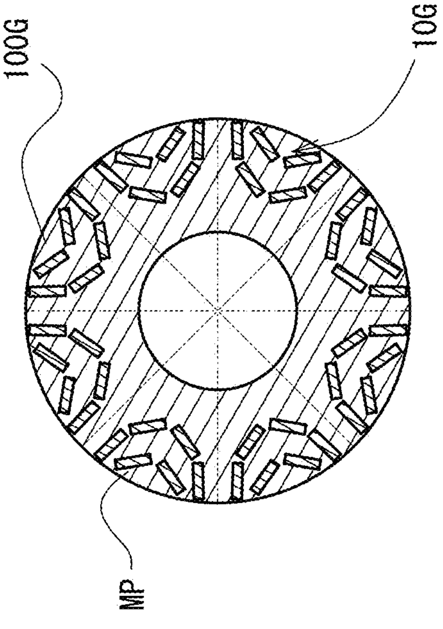
FIG. 28C is a cross-sectional view schematically showing an arrangement pattern of permanent magnets according to another embodiment.
Figure 28D:
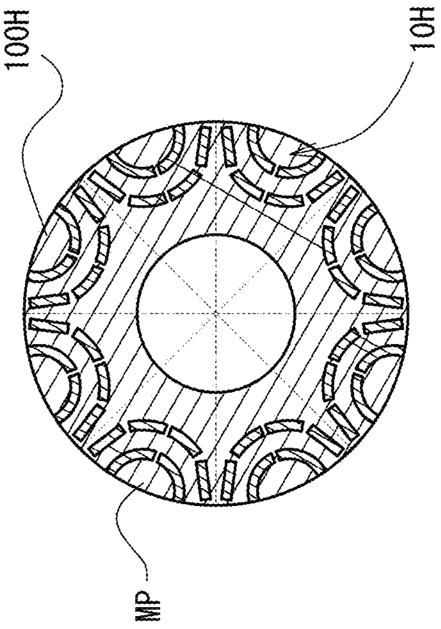
FIG. 28D is a cross-sectional view schematically showing an arrangement pattern of permanent magnets according to another embodiment.

Furthermore, for example, if (3) the center bridgeless structure or (4) the squeezing section 39 is adopted, then, the rotor may be an eight-pole rotor 10E in which each magnetic pole MP has a two-layered magnet section 110E consisting of a set of permanent magnets approximately parallel to the circumferential direction and four permanent magnets arranged inside in a U-shape, as shown in FIG. 28A, or an eight-pole rotor 10F in which each magnetic pole MP has a two-layered magnet section 110F consisting of two permanent magnets arranged in a V-shape and two permanent magnets arranged inside in a V-shape, as shown in FIG. 28B, or an eight-pole rotor 10G in which each magnetic pole MP has a two-layered magnet section 110G consisting of two permanent magnets arranged in a V-shape and four permanent magnets arranged inside in a U-shape, as shown in FIG. 28C, or an eight-pole rotor 10H in which each magnetic pole MP has a two-layered magnet section 110H consisting of two permanent magnets in an inverted arc shape and four permanent magnets arranged inside in a U-shape, as shown in FIG. 28D.

Figure 29:
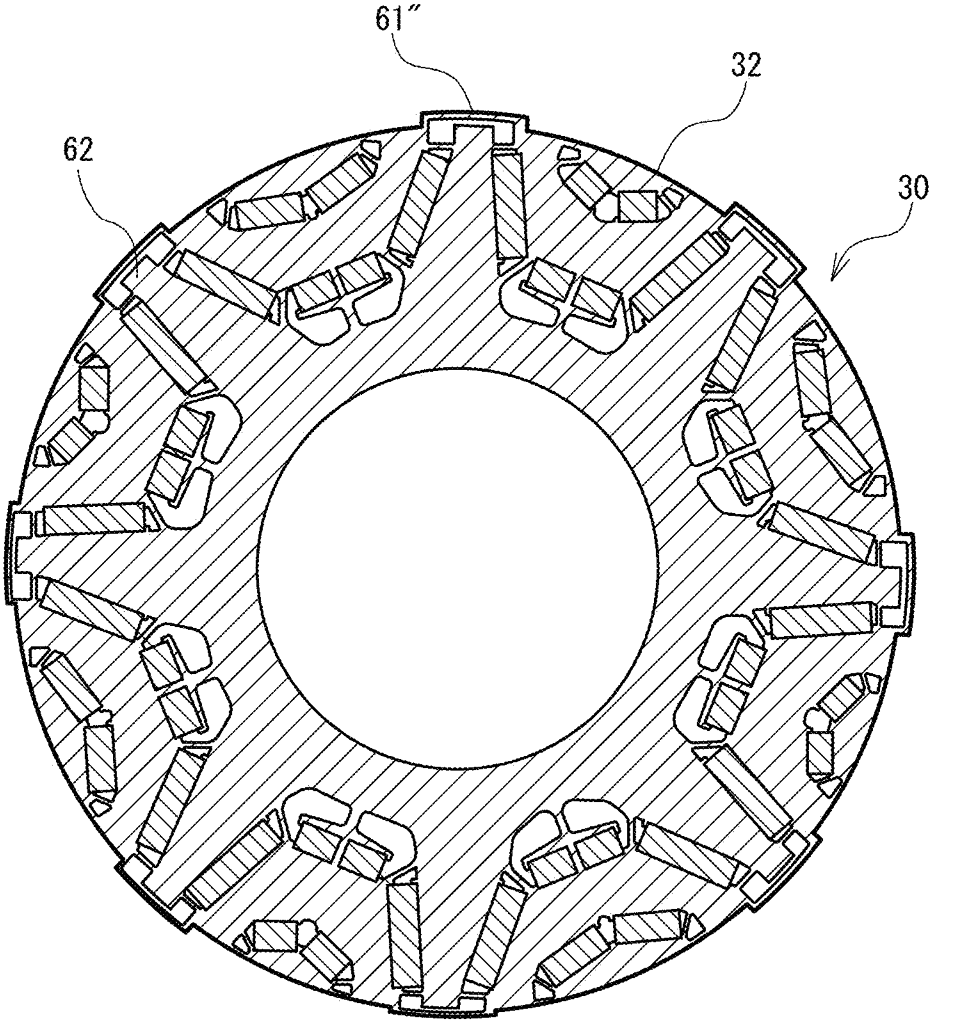
FIG. 29 is a cross-sectional view schematically showing a rotor core according to another embodiment.

Furthermore, in the above embodiment, the first protrusion portion 61 is formed so as to protrude relatively radially outward by recessing radially inward the outer peripheral surfaces 32*a*, 32*b* of the rotor core 30 corresponding to both circumferential ends of the first protrusion portion 61, however, the present invention is not limited to this, and the first protrusion portion 61" may be formed so as to absolutely (actually) protrude radially outward from the outer peripheral surface 32 of the rotor core 30, as shown in FIG. 29, for example. In this case, although the effect of reducing the cogging torque is weakened, it is possible to further emphasize the magnetic saliency.

Figure 30:
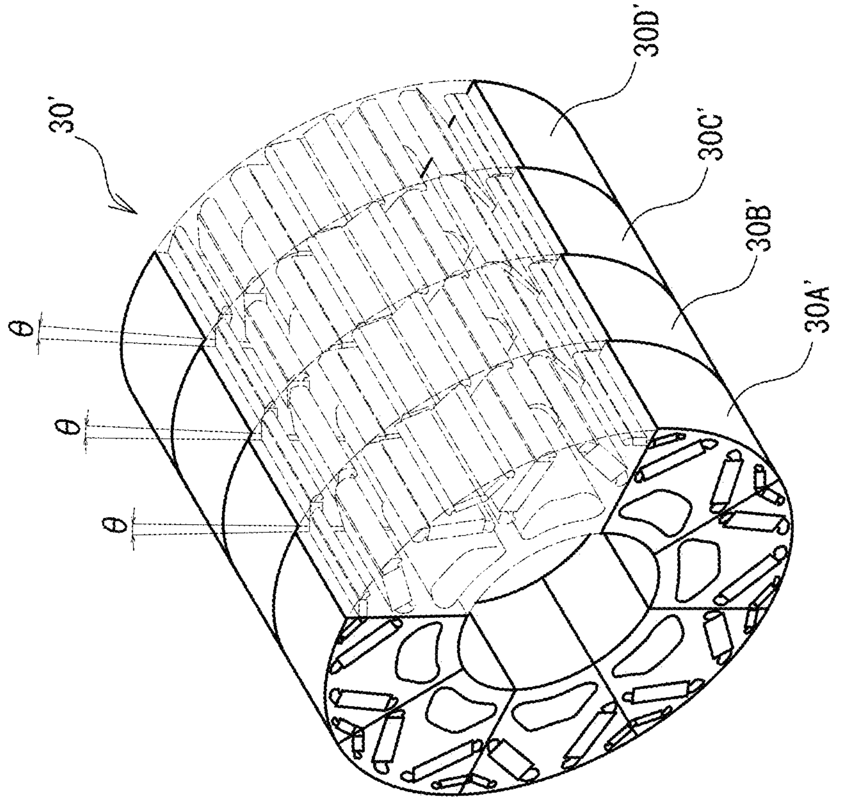
FIG. 30 is a perspective view schematically showing a rotor core according to another embodiment.

In the above embodiment, the rotor core 30 is so-called skewless, but the present invention is not limited to this, and may be applied to a rotor core 30' having a skew angle θ, which is formed by combining four laminates 30A', 30B', 30C', and 30D', each of which is made by stacking a predetermined number of magnetic thin plates in the axial direction, with each laminate being shifted by a predetermined angle θ, as shown in FIG. 30, for example. In this case, it is possible to further reduce the cogging torque.

Furthermore, in the above embodiment, the permanent magnets 101, 102, 103, and 106 and the coil ends 93*a* and 93*b* are the parts to be cooled, however, the present invention is not limited to this, and for example, a separate cooling means may be provided for the coil ends 93*a* and 93*b*, and only the permanent magnets 101, 102, 103, and 106 may be cooled.

In addition, in the above embodiment, the four permanent magnets 101, 102, 103, and 106 among the six permanent magnets 101, 102, 103, 104, 105, and 106 that constitute each magnetic pole are targeted for cooling, but the present invention is not limited to this, and for example, the permanent magnets 104 and 105 may be targeted for cooling.

As such, the above-described embodiments are merely illustrative in all respects and should not be construed as limiting. Furthermore, all modifications and variations belonging to the equivalent scope of the claims are within the scope of the present invention.

Although the present disclosure has been described based on the embodiments, it is understood that the present disclosure is not limited to the embodiments or structures. The present disclosure also includes various modification examples and modifications within the equivalent range. In addition, various combinations and forms, and other combinations and forms including only one element, more than one element, or less than one element, are also within the scope and concept of the present disclosure.

INDUSTRIAL APPLICABILITY

According to the present invention, even when the synchronous motor is miniaturized, high efficiency and low vibration and low noise can be achieved, therefore, it is extremely useful to apply the present invention to the rotor structure of a synchronous motor.

What is claimed is:

1. A rotor structure of a synchronous motor in which a rotor rotates in synchronization with a rotating magnetic field generated by a stator, characterized in that:

the rotor comprises a cylindrical rotor core and a plurality of permanent magnets embedded in the rotor core that form a plurality of magnetic poles arranged in a circumferential direction of the rotor, a first protrusion portion extending in the circumferential direction so as to straddle adjacent magnetic poles when viewed in an axial direction and protruding radially outward is formed on an outer circumferential surface of the rotor core, and inside the first protrusion portion, a first gap extending circumferentially when viewed in the axial direction is formed and a second protrusion portion protruding radially outward from a portion that defines a radially inner side of the first gap is formed.

2. The rotor structure according to claim 1, characterized in that:

the first protrusion portion is formed so as to protrude relatively radially outward by recessing radially inward an outer peripheral surface of the rotor core corresponding to both circumferential ends of the first protrusion portion when viewed in the axial direction.

3. The rotor structure according to claim 1, characterized in that:

the second protrusion portion protrudes at an incline with respect to the radial direction so as to be inclined at a predetermined angle in the circumferential direction as the portion extends radially outward.

4. The rotor structure according to claim 1, characterized in that:

the second protrusion portion extends to a portion that defines the radially outer side of the first gap so as to circumferentially divide the first gap.

5. The rotor structure according to claim 1, characterized in that:

the permanent magnets are inserted into magnet holes that axially penetrate the rotor core, and when viewed in the axial direction, at least one of a position, shape, size, and inclination of the permanent magnets, and the position, shape, size, and inclination of the magnet holes in each of the magnetic poles is set so as to be asymmetric between the magnetic poles adjacent in the circumferential direction.

6. The rotor structure according to claim 5, characterized in that:

the first protrusion portion is formed so as to protrude relatively radially outward by recessing radially inward an outer peripheral surface of the rotor core corresponding to both circumferential ends of the first protrusion portion when viewed in the axial direction, and depths of the recesses at both circumferential ends of the first protrusion portion are set to be asymmetric.

7. The rotor structure according to claim 5, characterized in that:

the magnet hole is used as an oil passage for flowing a cooling oil.

8. The rotor structure according to claim 1, characterized in that:

the permanent magnets are inserted into magnet holes that axially penetrate the rotor core, each of the magnetic poles includes two permanent magnets that are circumferentially adjacent within the magnet hole, and a space between the two adjacent permanent magnets is a second gap.

9. The rotor structure according to claim 8, characterized in that:

an end of the magnet hole into which the two permanent magnets are inserted is close to an outer peripheral surface of the rotor core, and a third gap at that end that is not filled with the permanent magnet is separated by a bridge portion.

10. The rotor structure according to claim 9, characterized in that:

when viewed in the axial direction, at least one of a position, shape, size, and inclination of the permanent magnet in each of the magnetic poles is set so as to be asymmetric between the magnetic poles adjacent in the circumferential direction, and a relative angle between the permanent magnet and the bridge portion is set so as to be asymmetric between the magnetic poles adjacent in the circumferential direction.

11. The rotor structure according to claim 8, characterized in that:

the magnet hole is used as an oil passage for flowing a cooling oil.

12. The rotor structure according to claim 1, characterized in that:

the permanent magnets are inserted into magnet holes that axially penetrate the rotor core, each of the magnetic poles comprises an outer magnet hole extending in the circumferential direction and formed in an outermost periphery of the rotor core, and an inner magnet hole extending in the circumferential direction and formed radially inward of the outer magnet hole, the inner magnet hole is formed in a shape such that a radially outer surface of the inner permanent magnet inserted into the inner magnet hole contacts the rotor core, and a radially inner portion not filled with the inner permanent magnet has a relatively large fourth gap, and the rotor core has a long and narrow squeezing section formed that circumferentially divides the fourth gap and extends radially through a d-axis of each magnetic pole so as to connect a portion of the rotor core that is radially inward of the inner permanent magnet when viewed in the axial direction to the inner permanent magnet.

13. The rotor structure according to claim 12, characterized in that:

the magnet hole is used as an oil passage for flowing a cooling oil.

14. The rotor structure according to claim 1, characterized in that:

the rotor core has a skew angle of 0 degrees.

* * * * *